(12) United States Patent
Hara

(10) Patent No.: US 6,285,831 B1
(45) Date of Patent: Sep. 4, 2001

(54) OPTICAL APPARATUS WITH A POSTURE DETECTION DEVICE

(75) Inventor: Yoshihiro Hara, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/150,367

(22) Filed: Sep. 9, 1998

(30) Foreign Application Priority Data

| Sep. 9, 1997 | (JP) | 9-244420 |
| Sep. 9, 1997 | (JP) | 9-244421 |
| Sep. 9, 1997 | (JP) | 9-244422 |
| Sep. 9, 1997 | (JP) | 9-244423 |

(51) Int. Cl.[7] .................... G03B 15/03; G03B 17/00
(52) U.S. Cl. .................... 396/50; 396/55; 396/155
(58) Field of Search .................... 396/52, 54, 55, 396/50, 155, 53

(56) References Cited

U.S. PATENT DOCUMENTS

| 4,904,854 | | 2/1990 | Ishida et al. | 250/201 |
| 4,970,540 | | 11/1990 | Vasey et al. | 354/202 |
| 5,231,445 | * | 7/1993 | Onuki et al. | 396/55 |
| 5,262,820 | * | 11/1993 | Tamai et al. | 396/54 |
| 5,264,889 | | 11/1993 | Ishida et al. | 354/402 |
| 5,335,032 | | 8/1994 | Onuki et al. | 354/195.1 |
| 5,640,611 | * | 6/1997 | Kai et al. | 396/55 |
| 5,734,932 | * | 3/1998 | Washisu | 396/55 |
| 5,805,937 | * | 9/1998 | Kitagawa | 396/55 |
| 5,850,575 | * | 12/1998 | Ohishi | 396/52 |
| 6,047,134 | * | 4/2000 | Sekine et al. | 396/55 |
| 6,072,525 | * | 6/2000 | Kaneda | 396/55 X |

FOREIGN PATENT DOCUMENTS

| 6-003724 | 1/1994 | (JP) . |
| 7-261230 | 10/1995 | (JP) . |

* cited by examiner

Primary Examiner—W. B. Perkey
(74) Attorney, Agent, or Firm—Sidley Austin Brown & Wood

(57) ABSTRACT

A camera is provided with a correction lens movable in two directions perpendicularly intersecting each other; a target position setter for setting a target position for the correction lens; a driver for moving the correction lens to a set target position; a detector for detecting a position at which the correction lens has been moved by a predetermined driving energy and stopped; and a posture detector for detecting a posture of the camera comparing a moved position with the target position.

32 Claims, 14 Drawing Sheets

OPTICAL APPARATUS WITH A POSTURE DETECTION DEVICE

This application is based on patent application Nos. 9-244420, 9-244421, 9-244422, and 9-244423 filed in Japan, the contents of which is hereby incorporated by reference.

BACKGROUND OF THE INVENTION

This invention relates to an optical apparatus such as a camera which can detect its posture.

It is a common practice that a photographer changes the posture of camera from the horizontal or landscape posture (i.e., the transverse direction of the camera is parallel to the ground) to the vertical or portait posture (i.e., the transverse direction of the camera is normal to the ground) and vice versa in accordance with a position of an object or his/her preferred composition. To ensure precise shake correction control and focusing control, it has been appreciated to change sensing regions and other parameters for these controls in accordance with the posture of camera. Accordingly, it has been demanded to detect the posture of camera promptly and precisely.

U.S. Pat. No. 5,335,032 discloses a method for detecting the posture of a camera with respect to the gravitational direction based on a position of a shake correction lens adapted for shifting the optical axis of the taking lens. Specifically, the shake correction lens is freely movable when the shake correction lens is not driven (i.e., set at a free state). A position sensing device (PSD) or the like is provided in the camera to detect an extreme position into which the shake correction lens has freely moved and from which it is difficult to freely move further.

For this posture detection method, the PSD detects the extreme position where the shake correction lens is difficult to freely move further, thereby judging the posture of the camera. Accordingly, it is impossible or hard to detect the posture of camera in the case that the shake correction lens has moved and stopped at a position slightly before the extreme position. Also, the posture detection is not feasible in the case that the camera is shaken. Further, there is the problem that the posture detection cannot be performed until the shake correction lens moves into the extreme position by the weight thereof.

Conventionally, a shake amount is detected by obtaining data about image within a predetermined single sensing region of the field of view, and comparing obtained image data with base an image data. However, satisfactory shake correction has not been accomplished in the arrangement where a single sensing region is fixedly set in the field of view. For instance, in the flash-assisted photography, it is preferable to detect a shake amount through an end portion of the field of view rather than through a center portion of the field of view. The shake correction on the fixed single sensing region cannot cope with versatile demands of shake correction which vary according to various photography conditions.

U.S. Pat. No. 4,904,854 and U.S. Pat. No. 5,264,889 disclose a method of selecting sensing regions necessary for auto-focusing in accordance with a camera posture. Specifically, according to the method of U.S. Pat. No. 4,904,854, when the camera is judged to be in a vertical posture, a lower sensing region of a plurality of sensing regions is suspended from use for auto-focusing control on the assumption that the lower sensing region is liable to sense an object closer to the camera than a main object. Also, according to the method of U.S. Pat. No. 5,264,889, when the camera is judged to be in a vertical posture, a sensing region which has no symmetrical corresponding sensing region in the vertical posture is suspended from use for auto-focusing control. However, these sensing region selections are carried out to prevent wrong auto-focusing, but not to reduce the calculation time for auto-focusing.

SUMMARY OF THE INVENTION

It is an object of the present invention to provide an optical apparatus which has overcome the problems residing in the prior art.

According to an aspect of the invention, an optical apparatus comprises: an optical system having an optical axis; a correction lens movable on a plane intersecting the optical axis; a controller which sets a target position for the correction lens; a driver which drives the correction lens to set a target position; and a detector which detects a current position of the correction lens. The controller sets a correction for the target position by comparing the current position with the target position.

According to another aspect of the invention, an optical apparatus comprises: a movable member movable on a predetermined plane; a controller which sets a target position for the movable member; a driver which moves the movable member to a set target position; and a detector which detects a position at which the movable member has been moved by a predetermined driving energy and stopped. The controller detects a posture of the optical apparatus comparing a moved position with the target position.

According to still another aspect of the invention, an optical apparatus comprises: a photographing device which obtains an object image; a detector which detects a shake of the optical apparatus with respect to the object image; and a controller which controls the detection manner of the detector in accordance with a photographic condition of the photographing device.

According to yet another aspect of the invention, an optical apparatus comprises: an area sensor including a plurality of shake detection regions; a posture detector which detects a posture of the optical apparatus; and a selector which selects a shake detection region based on a detected posture.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
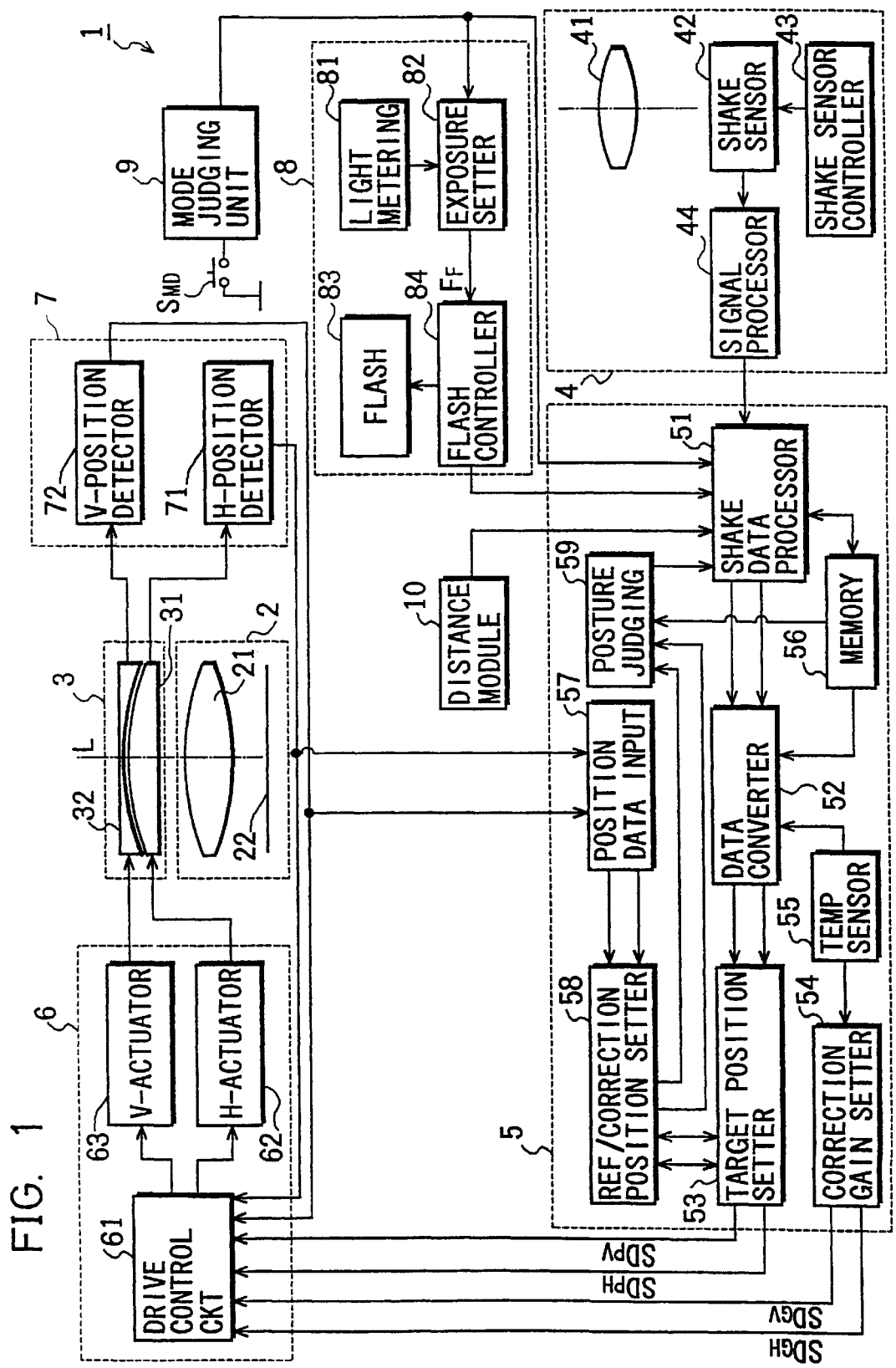
FIG. 1 is a block diagram showing a camera embodying the present invention.

FIG. 1 shows a control construction of a camera embodying the invention. A camera 1 comprises a picture taking section 2, a correction lens unit 3, a shake detecting section 4, a shake correction section 5, a driving section 6, a position detecting section 7, an exposure controlling section 8, a mode judging section 9, and a distance metering module 10.

The picture taking section 2 includes a taking lens 21 having an optical axis L and a mechanism for feeding a loaded film 22 to a focusing position on the optical axis L, and is adapted to take up a light image of an object.

The correction lens unit 3 includes horizontal and vertical shake correction lenses 31, 32 provided before the taking lens 21 and is adapted to correct a displacement of an object light image by means of a refraction. The horizontal and vertical correction lenses 31, 32 have optical axes parallel to the optical axis L, respectively, and are so supported as to be movable on a plane normal to the optical axis L in horizontal and vertical directions which are normal to each other.

The shake detecting section 4 includes a detection lens 41, a shake sensor 42, a shake sensor controller 43 and a signal processor 44, and is adapted to obtain image data used to detect a displacement of an object light image caused by a shake of the main body of the camera 1 with respect to the object.

The detection lens 41 has an optical axis parallel to the optical axis L of the taking lens 21, and focuses the object light image on the shake sensor 42 provided therebehind.

The shake sensor 42 is an area sensor in which a multitude of photoelectric conversion elements, such as a CCD, are arrayed in a two-dimensional form, and is adapted to sense the object light image focused by the detection lens 41 and to generate an electrical image signal corresponding to the amount of received light. The image signal is a collection of respective pixel signals of the photoelectric conversion elements.

The shake sensor controller 43 controls the shake sensor 42 to sense the object light image for a predetermined time (time for accumulating electric charges, or simply referred to as "integration time") and to send the respective pixel signals obtained during this sensing operation to the signal processor 44. The signal processor 44 applies specified signal processings (signal amplification, offset adjustment, etc.) to the image signal sent from the shake sensor 42, and converts the analog image signal into digital image data.

Figure 2A:
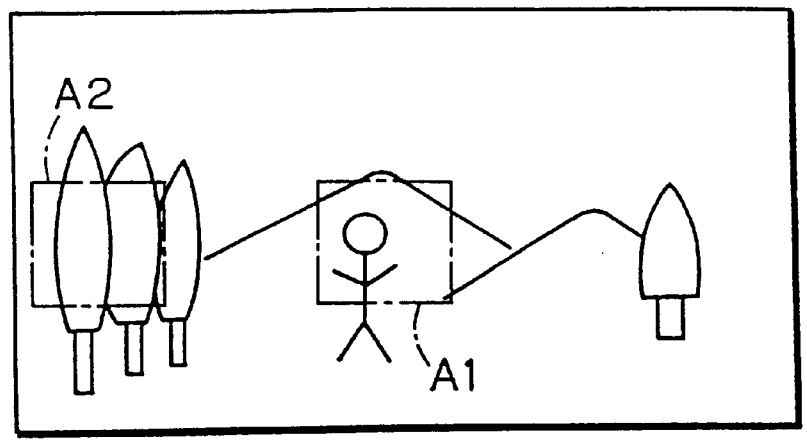
FIG. 2A is a diagram showing the position of sensing regions relative to an object when the camera is in a horizontal posture.
Figure 2B:
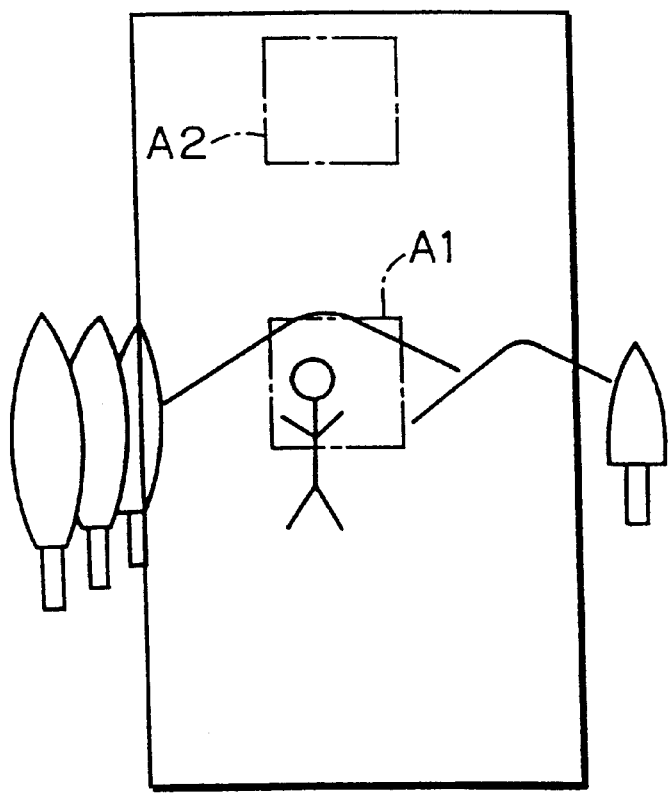
FIG. 2B is a diagram showing the position of sensing regions relative to an object when the camera is in a vertical posture.

FIGS. 2A and 2B are diagrams showing a position of sensing regions of the shake sensor 42. FIG. 2A shows a position of the sensing regions of the shake sensor 42 when the camera 1 is in the horizontal posture, and FIG. 2B shows a position of the sensing regions of the shake sensor 42 when the camera 1 is in the vertical posture. In this embodiment, the shake sensor 42 is so constructed as to sense two portions of the field of view, a center sensing region A1 directed to a center portion of the field of view and an end sensing region A2 directed to an end portion of the field of view. More specifically, the shake sensor 42 is provided with two separate light receiving surfaces, one being adapted for receiving light rays from a center portion of the object and defining the center sensing region A1, and the other being adapted for receiving light rays from an end portion of the object and defining the end sensing region A2.

The shake sensor 42 may be provided with a single light receiving surface for receiving light rays from the whole object. In this case, an image signal from the shake sensor 42 is so processed in the signal processor 44 as to generate only two image data corresponding to the two sensing regions A1 and A2, respectively.

The shake correction section 5 includes a shake data processor 51, a data converter 52, a target position setter 53, a correction gain setter 54, a temperature sensor 55, a memory 56, a position data input device 57, a reference/correction position setter 58, and a posture judging device 59. The shake correction section 5 generates shake correction data to the driving section 6.

The temperature sensor 55 is adapted to detect an ambient temperature of the camera 1. The memory 56 includes a RAM for temporarily storing image data and shake amount data, and an EEPROM for storing a conversion coefficient to be used in the data converter 52, and data to be used in the posture judging device 59.

Figure 3:
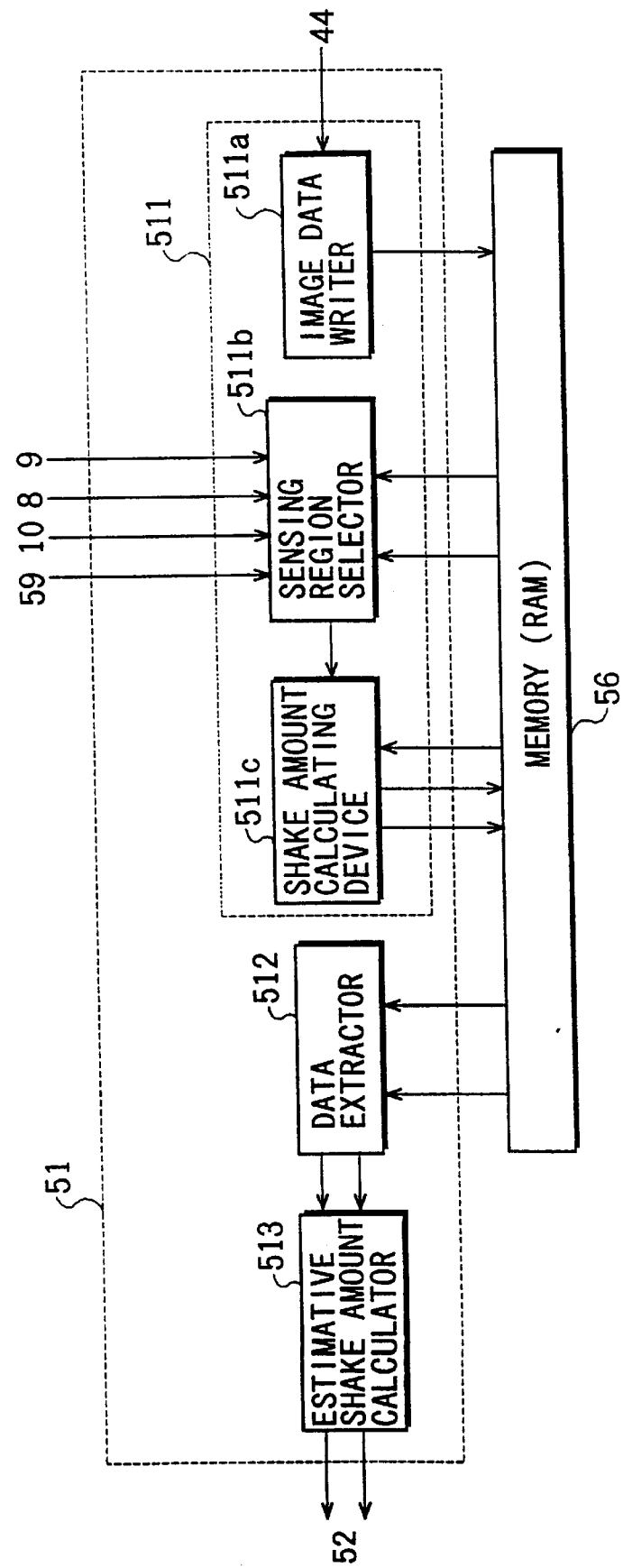
FIG. 3 is a block diagram showing a construction of a shake data processor provided in the camera.

The shake data processor 51 is described in more detail with reference to FIG. 3. Referring to FIG. 3, the shake data processor 51 comprises an actual shake amount calculator 511, a data extractor 512, and an estimative shake amount calculator 513. The shake data processor 51 calculates an actual shake amount based on image data from the signal processor 44 and then calculates an estimative shake amount based on a calculated actual shake amount.

The actual shake amount calculator 511 includes an image data writer 511a, a sensing region selector 511b, and an actual shake amount calculating device 511c. The image data writer 511a writes image data corresponding to the sensing regions A1 and A2 on specified addresses of the RAM of the memory 56.

The sensing region selector 511b selects either one of the sensing regions A1 and A2. Selection of the sensing region A1 or A2 is made based on whether the camera 1 is set at "flash prohibition mode" or a mode other than "flash prohibition mode". The actual shake amount calculating device 511c calculates an actual shake amount based on image data in a selected sensing region.

The camera 1 is provided with selective photographic modes, such as "flash prohibition mode", "night scene mode", "slow synchro mode", and "auto flash mode". Selection of these modes is detected based on an operative position of a switch SMD for changing over the photographic modes of the camera 1.

When the camera 1 is set at "flash prohibition mode", the sensing region selector 511b selects the sensing region A1 or A2 in accordance with posture information as to whether the camera 1 is in a vertical posture or a horizontal posture from the posture judging device 59 which is described later.

More specifically, when the camera 1 is judged to be in a vertical posture, the sensing region selector 511b first reads out image data corresponding to the sensing region A1 from the memory 56, and compares a contrast value (spatial frequency) $C_{A1}$ of this image data with a predetermined reference value Ca. If $C_{A1}>Ca$, the sensing region selector 511b selects the sensing region A1. If $C_{A1}<Ca$, the sensing region selector 511b selects the sensing region A2. This is because it is highly likely in the vertical posture that the end sensing region A2 comes off from a main object to a background such as the sky or the ground, while the center sensing region A1 comes into the main object, as shown in FIG. 2B.

On the other hand, when the camera 1 is judged to be set at the horizontal posture, the sensing region selector 511b reads out image data corresponding to both sensing regions A1 and A2 from the memory 56, and compares a contrast value $C_{A1}$ of the image data corresponding to the sensing region A1 with a contrast value $C_{A2}$ of the image data corresponding to the sensing region A2. If $C_{A1}>C_{A2}$, the sensing region selector 511b selects the sensing region A1. If $C_{A1}<C_{A2}$, the sensing region selector 511b selects the sensing region A2. This is because there are two possibilities in the horizontal posture that a main object is sensed in the sensing region A1 or in the sensing region A2.

When the camera 1 is set at "night scene mode", "slow synchro mode", or "auto flash mode", the sensing region selector 511b selects the sensing region A1 or A2 based on a flag $F_F$ indicative of use/non-use of a flash sent from the exposure controlling section 8, and object distance data sent from the distance metering module 10.

More specifically, when the flag $F_F$ is set at 1 ($F_F=1$) indicative of use of the flash, and the object distance is within a flash light coverage distance D, the sensing region selector 511b first reads out image data corresponding to the sensing region A2 from the memory 56, and compares a contrast value $C_{A2}$ of this image data with a predetermined reference value Cb. As a result of comparison, if $C_{A2}>Cb$, the sensing region selector 511b selects the sensing region A2. If $C_{A2}<Cb$, the sensing region selector 511b selects the sensing region A1.

This selection is made based on the following assumption. If a main object comes into the center sensing region A1, the main object can be estimated to receive enough flash light to eliminate influence of a camera shake. On the other hand, if a main object comes off from the center sensing region A1, the main object can be estimated not to receive enough flash light to eliminate influence of a camera shake. In other words, there is a high likelihood that the main object is not properly photographed. It should be noted that the distance D is obtained by dividing the guide number GNo of the flash by an aperture-stop value.

Next, when the flag $F_F$ indicates non-use of the flash ($F_F=0$), or the object distance is beyond the flash light coverage distance D, the sensing region selector 511b reads out image data corresponding to both sensing regions A1, A2 from the memory, compares contrast values $C_{A1}$, $C_{A2}$ of the image data in the sensing regions A1, A2, and selects a region which provides image data having a higher contrast value. This is because of the fact that in this case, there is no guarantee that a main object is in the sensing region A1, and a main object will not be estimated to be improperly exposed even if the object distance is beyond the distance D. Accordingly, the contrast values of both regions A1 and A2 are compared with each other. Alternatively, the sensing region selection may be performed in the same manner as the sensing region selection in the case of "flash prohibition mode".

It should be noted that contrast values used for the above selections may be a maximum or an average of image data pertaining to each sensing region.

Next, the actual shake amount calculating device 511c is described. The actual shake amount calculating device 511c is adapted for calculating an actual shake amount based on image data of the sensing region A1 or A2 selected by the sensing region selector 511b. Specifically, the actual shake amount calculating device 511c uses latest image data stored in the memory 56. A shake amount is calculated by comparing reference image data with base image data on a pixel level. A shake amount in the horizontal direction and a shake amount in the vertical direction are calculated, and are temporarily stored in the memory 56.

Figure 4:
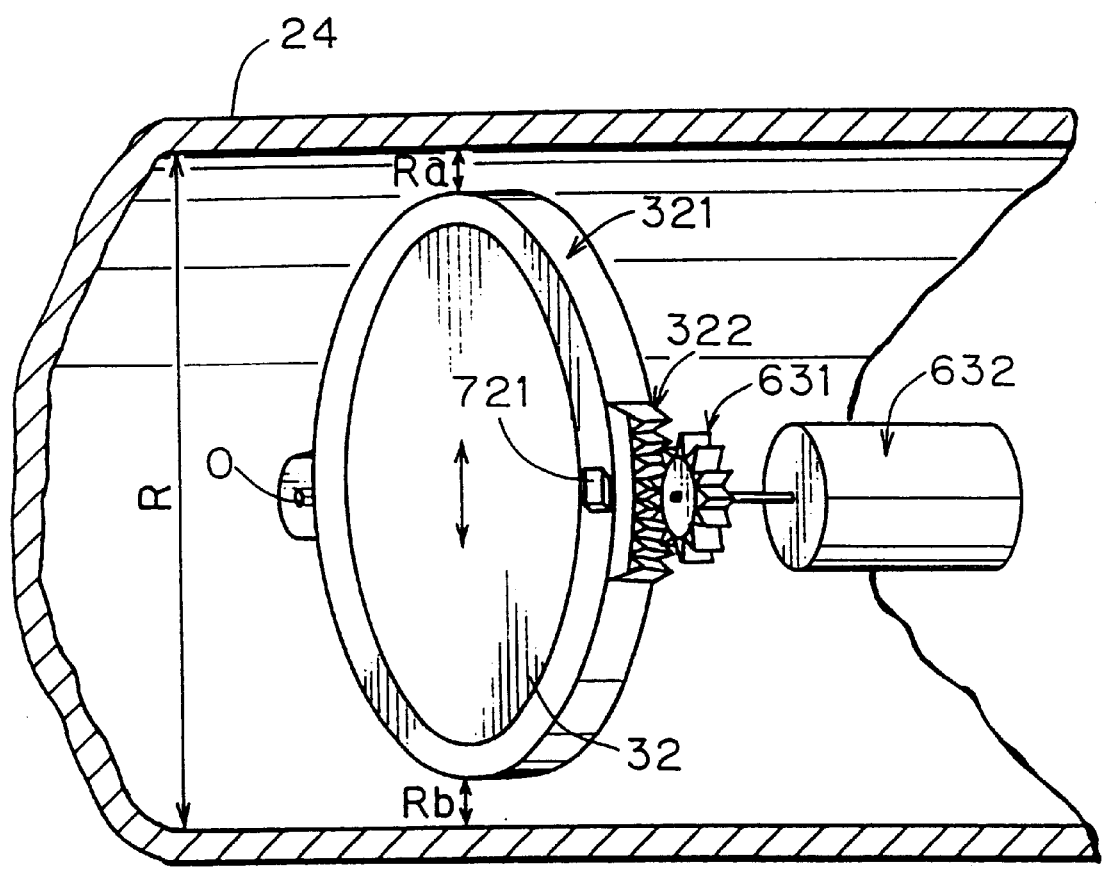
FIG. 4 is a perspective view of a vertical correction lens and its peripheral devices accommodated in a lens barrel of the camera.

FIG. 4 is a perspective view of the vertical correction lens 32 accommodated in a lens barrel 24 of the camera 1. The vertical correction lens 32 is held by a ring frame 321, and is pivotable about a pivot O on a vertical plane. A rack gear 322 is formed on a periphery of the ring frame 321 in a portion opposite to the pivot point O. A motor 632 has a pinion gear 631 which is meshed with the rack gear 322. When the motor 632 is driven, the pinion gear 631 is rotated, the ring frame 321 is consequently pivoted on the vertical plane by the way of the rack gear 322.

As can be seen clearly from FIG. 4, the vertical correction lens 32 is movable on the vertical plane within a space R that is substantially identical to an inner diameter of the lens barrel 24. The construction of the horizontal correction lens 31 is similar to that of the vertical correction lens 32 except that the horizontal correction lens 31 is movable in a horizontal plane normal to the vertical plane on which the vertical correction lens 32 moves. Accordingly, description on the construction of the horizontal correction lens 31 is omitted herein.

The base image data, which is used in the actual shake amount calculating device 511c, is image data obtained by the shake sensor 42 when the horizontal correction lens 31 and the vertical correction lens 32 are set in a specified position, e.g., in a center position from which the lens 31 or 32 is movable an equal distance (Ra=Rb in FIG. 4) in the opposite directions.

Figure 5:
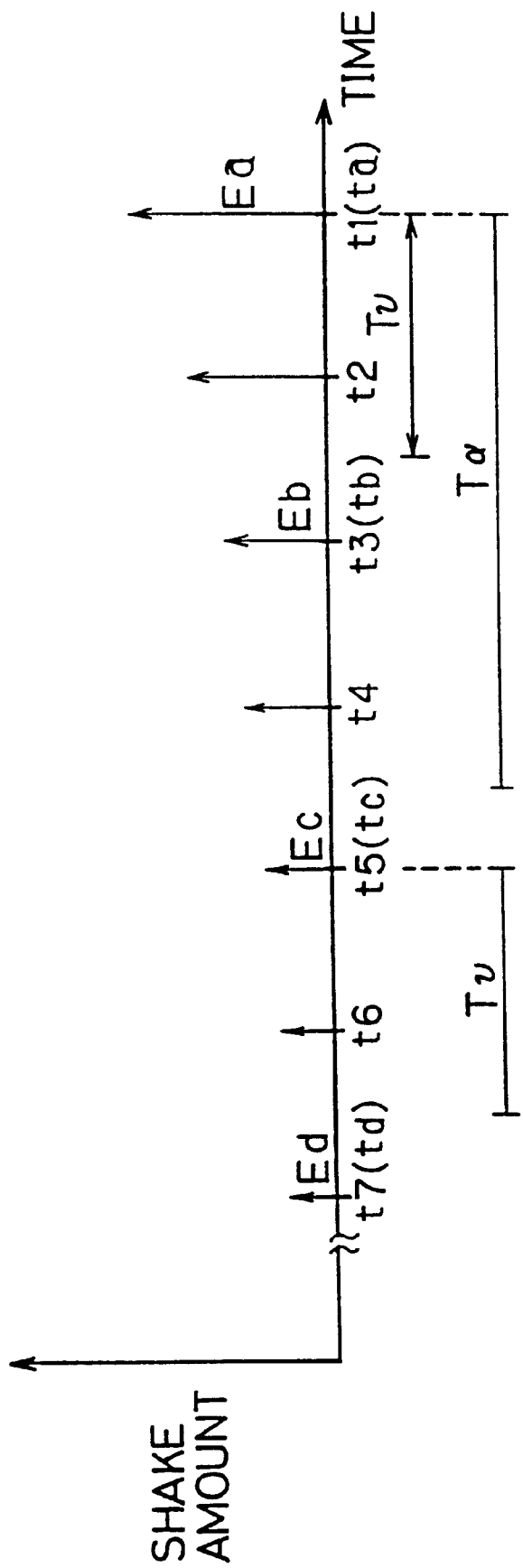
FIG. 5 is a diagram showing extraction of shake amount data.

Next, shake amount data extraction of the data extractor 512 is described with reference to FIG. 5. The shake data extractor 512 extracts data for four shake amounts including latest shake amount data from the memory 56 based on reference time spaces (time space Tv for calculation of reliable shake speed, and time space Tα for calculation of reliable shake acceleration rate).

Specifically, first shake amount data Ea at a latest image pickup time t1 is extracted. This time is hereinafter referred to as "time ta". Second shake amount data Eb is extracted at an image pickup time t3 (hereinafter, referred to as "time tb") which is prior to a time space Tv, originating before the time ta and concluding at the time ta. Third shake amount data Ec at an image pickup time t5 (hereinafter, referred to as "time tc"), which is prior to the time space Tα, originating before the time ta and concluding at the time ta. Finally, fourth shake amount data Ed is extracted at an image pickup time t7 (hereinafter, referred to as "time td") which is prior to the time space Tv "time td"), which is prior to a time space Tv, originating before the time tc and latest to time tc. Shake amount data Ea, Eb, Ec, Ed, at the respective times ta, tb, tc, td, are extracted with respect to the horizontal and vertical directions and stored in the memory 56.

In the foregoing extraction, data for three shake amounts excluding a shake amount data at a latest time, are extracted on the basis of times which are prior to the reference time spaces before the closet time and latest to the latest time. Alternatively, it may be appreciated to extract such shake amount data on the basis of times which are nearest to the reference time spaces before the latest time, or on the basis of times which are within the reference time spaces before the latest time and further before the latest time.

Referring back to FIG. 3, the estimative shake amount calculator 513 calculates an estimated shake amount of the camera 1 based on the shake amount data Ea, Eb, Ec, Ed which are selected with respect to the horizontal and vertical directions by the data extractor 512. Specifically, a shake speed V1 is calculated in accordance with Equation (1) based on the latest shake amount data Ea and the second shake amount data Eb, whereas a shake speed V2 is calculated in accordance with Equation (2) based on the third shake amount data Ec and the fourth shake amount data Ed. A shake acceleration rate α is calculated in accordance with Equation (3) based on the shake speeds V1, V2.

$$V1=(Ea-Eb)/(ta-tb) \qquad \text{[Equation 1]}$$

$$V2=(Ec-Ed)/(tc-td) \qquad \text{[Equation 2]}$$

$$\alpha=(V1-V2)/(ta-tc) \qquad \text{[Equation 3]}$$

Subsequently, based on the assumption that the shake changes as uniformly accelerated motion, an estimated shake amount $E_P$ is calculated in accordance with Equation (4) based on the latest shake amount data Ea, the shake speed V1 and the shake acceleration rate α.

$$E_P=Ea+V1 \times T+½k \times \alpha \times T^2 \qquad \text{[Equation 4]}$$

wherein k denotes a correction coefficient, and is smaller than 1. Also, T=(½)×T1+T2+T3+T4+Td. T1 denotes an integration time of the shake sensor 42, T2 denotes a time required for transferring image data from the shake sensor 42 to the memory 56, T3 denotes a time for calculating a shake amount, T4 denotes a time for calculating an estimative shake amount, and Td denotes a time until the correction lens unit 3 completes the movement of the correction lens after receiving estimated shake amount data from the shake correction section 5.

Referring back to FIG. 1, the data converter 52 converts estimated shake amount data with respect to the horizontal and vertical directions into target angular position data with respect to the horizontal and vertical directions for the correction lens unit 3 using a conversion coefficient stored in the memory 56. This converter 52 also calculates a correction coefficient based on the ambient temperature detected by the temperature sensor 55 and corrects the target angular position data using this correction coefficient. This correction coefficient is used to correct variations in the focal length of the detection lens 41 caused by a change in the ambient temperature and the refractive index of the correction lens.

The target position setter 53 converts the corrected target angular position data into target position information concerning target positions into which the horizontal shake correction lens 31 and the vertical shake correction lens 32 are moved. These target positions in the horizontal and vertical directions are set in the driving section 6 as control data $SD_{PH}$, $SD_{PV}$.

The correction gain setter 54 calculates gain correction amounts in the horizontal and vertical directions based on the ambient temperature detected by the temperature sensor 55, and set them in the driving section 6 as control data $SD_{GH}$, $SD_{GV}$. The gain correction amounts in the horizontal and vertical directions are adapted to correct basic gains in the horizontal and vertical directions in the driving section 6. The basic gains and the control data $SD_{GH}$, $SD_{GV}$ are described in detail later.

The position data input device 57 obtains the respective positions of the horizontal and vertical shake correction lenses 31, 32 by A/D converting the respective output signals of the position detector 7. An abnormality in the lens driving system of the correction lens unit 3 is found by checking the positions of the shake correction lenses.

The driving section 6 includes a drive control circuit 61, a horizontal actuator 62, and a vertical actuator 63. The drive control circuit 61 generates horizontal and vertical direction drive signals based on the control data $SD_{PH}$, $SD_{PV}$, $SD_{GH}$, $SD_{GV}$ from the target position setter 53 and the correction gain setter 54. The horizontal and vertical actuators 62, 63 each include a coreless motor or the like and drive the horizontal and vertical shake correction lenses 31, 32 in accordance with the horizontal and vertical direction drive signals generated by the drive control circuit 61.

Figure 6:
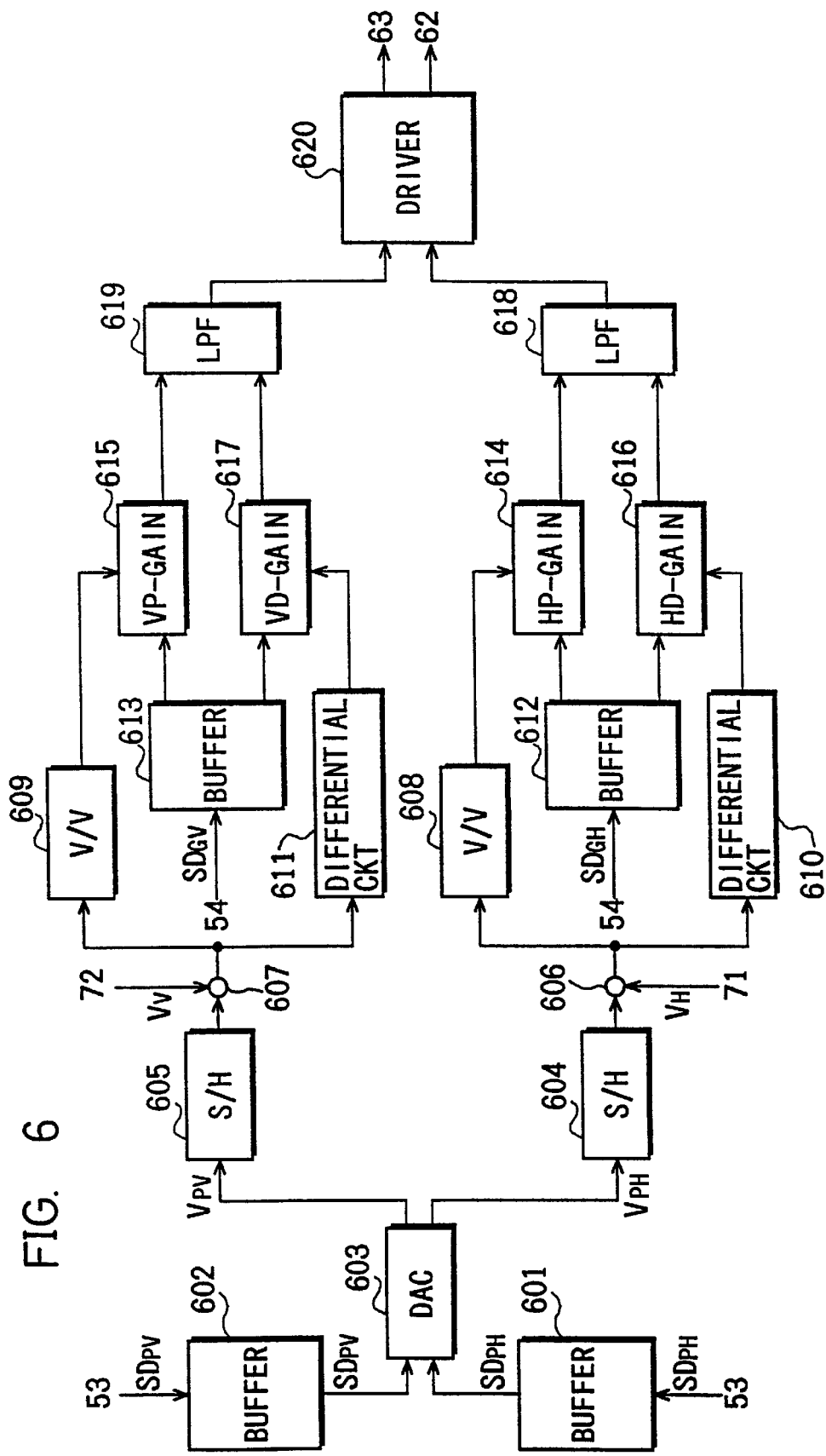
FIG. 6 is a block diagram showing a drive control circuit constituting a part of a servo control system provided in the camera.

Next, the drive control circuit 61 of the driving section 6 is described with reference to FIG. 6. FIG. 6 is a block diagram showing a construction of the drive control circuit 61 constituting part of a servo control system. First, the data $SD_{GH}$, $SD_{GV}$ set in the drive control circuit 61 are described. In the camera 1, a variation occurs in the driving performance of the lens driving system when the ambient temperature changes. For example, as the ambient temperature changes, the torque ratios of the motors (e.g., the motor 632 shown in FIG. 4), the backlash of the lens driving system of the correction lens unit 3 and the driving section 6, and the stiffness of the gears (e.g., rack gear 322 and pinion gear 631) of the lens driving system change.

Figure 7:
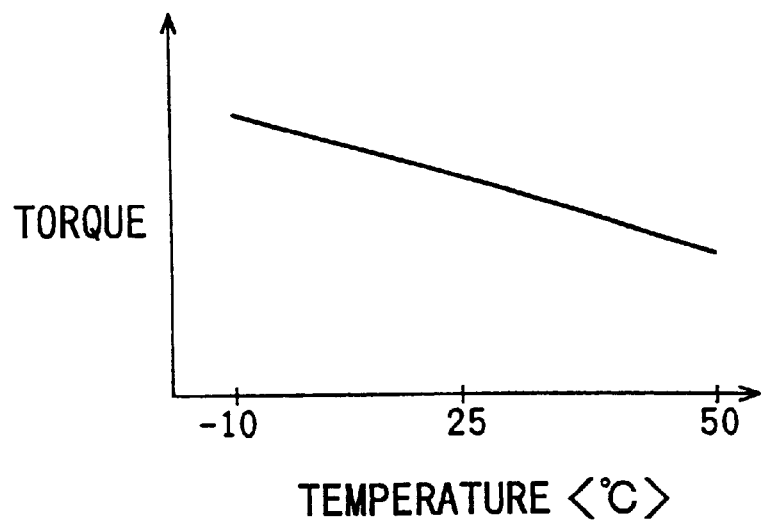
FIG. 7 is a graph showing a temperature characteristic of a drive motor provided in the camera, that affects the lens driving performance.

FIG. 7 is a graph showing a change in the driving performance (torque) of the motor with a temperature variation. As can be understood from FIG. 7, when the ambient temperature becomes different from a reference temperature (e.g., 25° C.), the motor torque changes from a value at the reference temperature. As a result, the driving performance of the lens driving system changes. In other words, the driving performance based on the basic gain of the horizontal and vertical direction (drive gains at the reference temperature) changes as the ambient temperature detected by the temperature sensor 55 changes from the reference temperature.

Accordingly, the correction gain setter 54 is so constructed as to generate gain correction data for correcting a variation in the driving performance based on the basic gain of horizontal and vertical direction in accordance with an ambient temperature detected by the temperature sensor 55. In this embodiment, there are provided functions to obtain gain correction data for individually compensating for variations in the motor torque, backlash and gears with a change in the ambient temperature from the reference temperature. The ambient temperatures detected by the temperature sensor 55 are put in the respective correction functions with respect to horizontal and vertical directions, and a sum of calculated values is obtained as a gain correction amount. The gain correction amounts with respect to horizontal and vertical directions are set in the drive control circuit 61 as the control data $SD_{GH}$, $SD_{GV}$.

Next, the drive control circuit 61 is described. Although the control data $SD_{GH}$, $SD_{GV}$ are shown to be transmitted via two signal lines in FIG. 1 to simplify the drawing, they are actually sent by serial transmission via two unillustrated data lines (SCK, SD) and three control lines (CS, DA/GAIN, X/Y). Similarly, the control data $SD_{PH}$, $SD_{PV}$ are alternately transmitted to the drive control circuit 61.

The drive control circuit 61 includes buffers and sample-and-hold circuits. In other words, buffers 601, 602 are memories for storing the data $SD_{PH}$, $SD_{PV}$ alternately set by the target position setter 53.

A digital-to-analog converter (DAC) 603 converts the control data $SD_{PH}$ in the buffer 601 and the control data $SD_{PV}$ in the buffer 602 into a target position voltage $V_{PH}$ and a target position voltage $V_{PV}$, respectively. A sample-and-hold (S/H) circuit 604 samples the target position voltage $V_{PH}$ converted by the DAC 603 and holds this value till a next sampling. Likewise, a S/H circuit 605 samples the target position voltage $V_{PV}$ converted by the DAC 603 and holds this value till a next sampling.

An adder circuit 606 calculates a difference between the target position voltage $V_{PH}$ and an output voltage $V_H$ of the horizontal position detector 71. An adder circuit 607 calculates a difference between the target position voltage $V_{PV}$ and an output voltage $V_V$ of the vertical position detector 72. In other words, the adder circuits 606, 607 obtain voltage differences by addition since the output voltages $V_H$, $V_V$ are obtained as negative voltages in the horizontal and vertical position detectors 71, 72.

Identified by V/V 608 is an amplifier for amplifying an input voltage to a voltage as a horizontal direction proportional gain at a ratio set in advance for the reference temperature. Identified by V/V 609 is an amplifier for amplifying an input voltage to a voltage as a vertical direction proportional gain at a ratio set in advance for the reference temperature. Here, the horizontal direction proportional gain is a gain proportional to a difference between the target position of the horizontal shake correction lens 31 and the position of the horizontal shake correction lens 31 detected by the horizontal position detector 71. Further, the vertical direction proportional gain is a gain proportional to a difference between the target position of the vertical shake correction lens 32 and the position of the vertical shake correction lens 32 detected by the vertical position detector 72.

A differential circuit 610 multiplies the voltage difference obtained by the adder circuit 606 by a differential and by a time constant set in advance for the reference temperature to obtain a voltage as a horizontal direction differential gain. The thus obtained voltage corresponds to a horizontal direction speed difference (a difference between a target driving speed and a present driving speed). Similarly, a differential circuit 611 multiplies the voltage difference obtained by the adder circuit 607 by a differential and by a time constant set in advance for the reference temperature to obtain a voltage as a vertical direction differential gain. The thus obtained voltage corresponds to a vertical direction speed difference (a difference between a target driving speed and a present driving speed).

In this way, the proportional and differential gains as the basic gains corresponding to the reference temperature are set with respect to horizontal and vertical directions by the amplifiers 608, 609 and the differential circuits 610, 611.

A buffer 612 is a memory for storing the control data $SD_{GH}$ of the correction gain setter 54. The control data $SD_{GH}$ is gain correction amounts (proportional and differential gain correction amounts) for correcting the horizontal direction basic gain (proportional and differential gains). A buffer 613 is a memory for storing the control data $SD_{GV}$ of the correction gain setter 54. The control data $SD_{GV}$ is gain correction amounts (proportional and differential gain correction amounts) for correcting the vertical direction basic gain (proportional and differential gains).

A HP gain correcting circuit 614 outputs a horizontal direction proportional gain after a temperature correction by adding an analog voltage corresponding to the horizontal direction proportional gain correction amount from the buffer 612 to the horizontal direction proportional gain obtained in the amplifier 608. Further, a VP gain correcting circuit 615 outputs a vertical direction proportional gain after the temperature correction by adding an analog voltage corresponding to the vertical direction proportional gain correction amount from the buffer 613 to the vertical direction proportional gain obtained in the amplifier 609.

A HD gain correcting circuit 616 outputs a horizontal direction differential gain after the temperature correction by adding an analog voltage corresponding to the horizontal direction differential gain correction amount from the buffer 612 to the horizontal direction differential gain obtained in the differential circuit 610. Further, a VD gain correcting circuit 617 outputs a vertical direction differential gain after the temperature correction by adding an analog voltage corresponding to the vertical direction differential gain correction amount from the buffer 613 to the vertical direction differential gain obtained in the differential circuit 611.

In this way, the proportional and differential gains as the basic gains are corrected according to temperature by the HP, VP, HD and VD gain correcting circuits 614, 615, 616 and 617.

A low pass filter (LPF) 618 removes high frequency noises included in the respective output voltages of the HP and HD gain correcting circuits 614, 616. A low pass filter (LPF) 619 removes high frequency noises included in the respective output voltages of the VP and VD gain correcting circuits 615, 617.

A driver 620 is an IC for the driving of the motor which supplies drive voltages corresponding to the output voltages of the LPFs 618, 619 to the horizontal and vertical actuators 62, 63, respectively.

The position detecting section 7 shown in FIG. 1 includes the horizontal and vertical position detectors 71, 72, which are adapted to detect the present or current positions of the horizontal and vertical shake correction lenses 31, 32, respectively.

Figure 8:
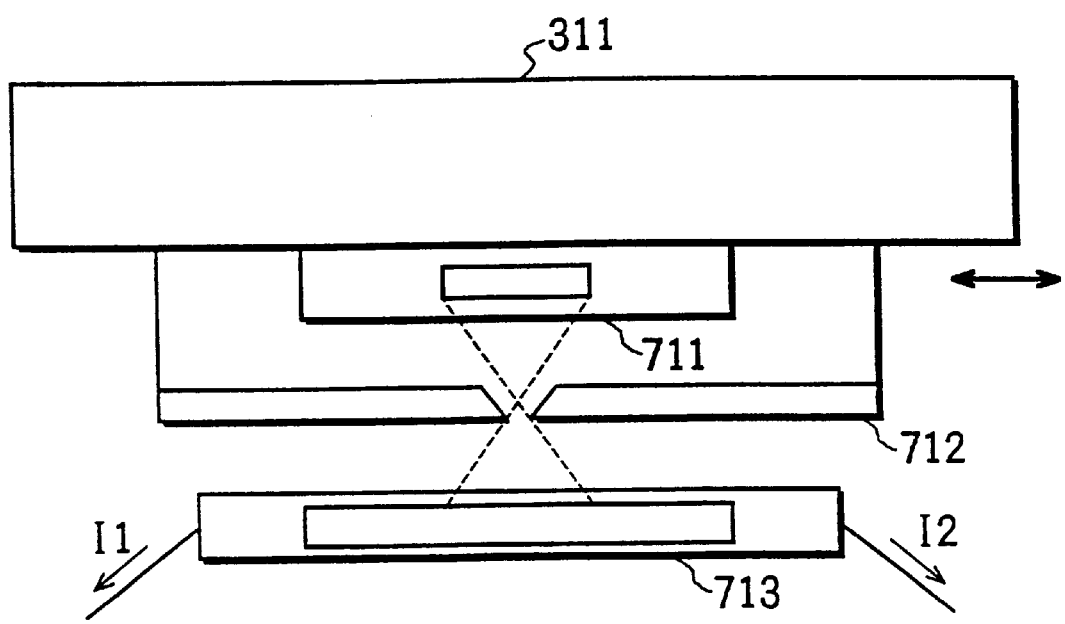
FIG. 8 is a schematic diagram of a horizontal position detector.

FIG. 8 is a schematic diagram of the horizontal position detector 71. The horizontal position detector 71 includes an LED (light-emitting diode) 711, a cover member 712 having a slit and a PSD (position sensing device) 713. The LED 711 is mounted in a position of the frame 311 of the horizontal shake correction lens 31 where the gear portion 312 is formed, and the cover member 712 having the slit is adapted to sharpen the directivity of the light emitted from a light emitting portion of the LED 711. The PSD 713 is mounted in a position of the inner wall of the lens barrel 24 of the camera main body opposite to the LED 711. This PSD 713 outputs photoelectrically converted currents I1, I2 of values corresponding to a light sensing position (center of gravity position) of the beams emitted from the LED 711. The position of the horizontal shake correction lens 31 is detected by measuring a difference between the photoelectrically converted currents I1 and I2. The vertical position detector 72 is similarly constructed so as to detect the position of the vertical shake correction lens 32.

Figure 9:
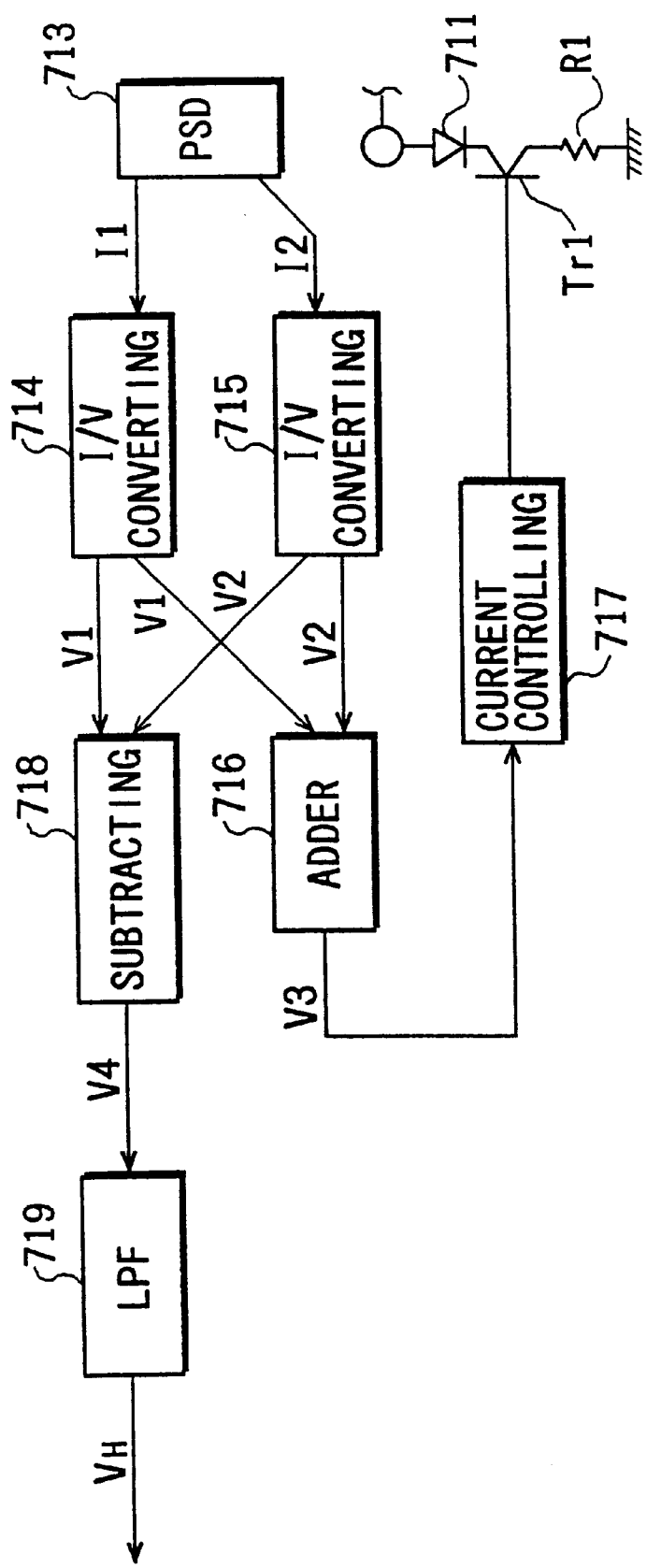
FIG. 9 is a block diagram of the horizontal position detector.

FIG. 9 is a block diagram of the horizontal position detector 71. In addition to the LED 711 and the PSD 713, the horizontal position detector 71 includes current-to-voltage (I/V) converting circuits 714, 715, an adder circuit 716, a current controlling circuit 717, a subtracting circuit 718, a low pass filter (LPF) 719, and the like. The I/V converting circuits 714, 715 respectively convert the output currents I1, I2 of the PSD 713 into voltages V1, V2. The adder circuit 716 calculates a sum voltage V3 of the output voltages V1, V2 of the I/V converting circuits 714, 715. The current controlling circuit 717 increases and decreases a base current to a transistor Tr1 so as to hold the output voltage V3 of the adder circuit 716, i.e., the amount of light emitted from the LED 711 constant. The subtracting circuit 718 calculates a difference voltage V4 of the output voltages V1, V2 of the I/V converting circuits 714, 715. The LPF 719 removes high frequency components included in the output voltage V4 of the subtracting circuit 718.

Next, the detection by the horizontal position detector 71 is described. The currents I1, I2 from the PSD 713 are converted into the voltages V1, V2 in the I/V converting circuits 714, 715, respectively. Subsequently, the voltages V1, V2 are added in the adder circuit 716. The voltage control circuit 717 supplies a voltage which makes the voltage V3 obtained by the addition always constant to the base of the transistor Tr1. The LED 711 emits light at an amount corresponding to this base current.

On the other hand, the voltages V1, V2 are subtracted in the subtracting circuit 718. The voltage V4 obtained by this subtraction is a value representing the position of the horizontal shake correction lens 31. For example, in the case that the light sensing position (center of gravity) is away to the right from the center of the PSD 713 by a length x, the length x, the currents I1, I2 and a length L of a light sensing area of the PSD 713 satisfy a relationship defined by Equation (5).

$$\frac{I2-I1}{I2+I1} = \frac{2 \cdot x}{L} \quad \text{[Equation 5]}$$

Similarly, the length x, the voltages V1, V2 and the length L of the light sensing area satisfy a relationship defined by Equation (6).

$$\frac{V2-V1}{V2+V1} = \frac{2 \cdot x}{L} \quad \text{[Equation 6]}$$

If control is performed so as to make a value of V1+V2, i.e., a value of the voltage V3 always constant, there can be obtained a relationship defined by Equation (7), in which a value of V2−V1, i.e., of the voltage V4 represents the length x. Accordingly, the position of the horizontal shake correction lens 31 can be detected if the voltage V4 is checked.

$$V2-V1 \propto x \quad \text{[Equation 7]}$$

Referring back to FIG. 1, the exposure controlling section 8 is described. The exposure controlling section 8 comprises a light metering device 81, an exposure setter 82, a flash 83, and a flash controller 84. The light metering device 81 includes a photoelectric conversion element, e.g., SPC (Silicon Photo Cell), for receiving light reflected from an object to detect a brightness of the object.

Figure 10:
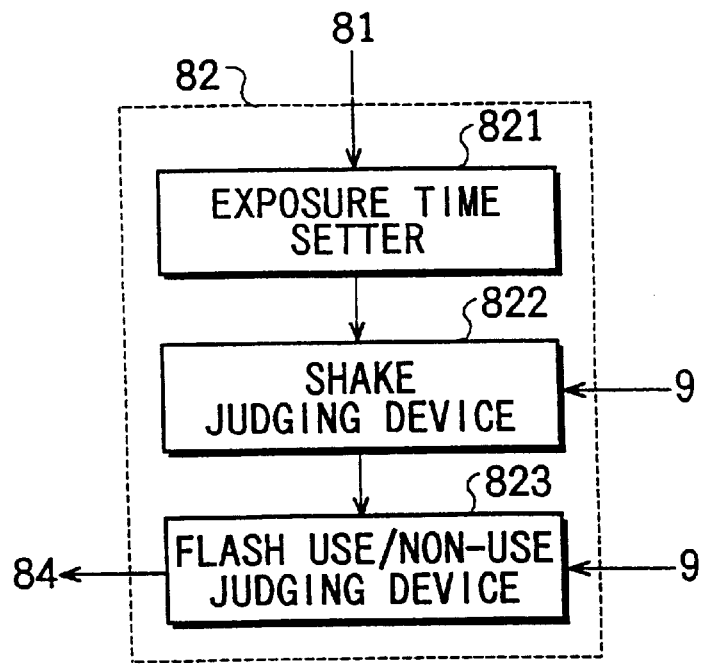
FIG. 10 is a block diagram of an exposure setter.

FIG. 10 is a block diagram showing a construction of the exposure setter 82. The exposure setter 82 includes an exposure time setter 821, a shake judging device 822, and a flash use/non-use judging device 823. The exposure time setter 821 sets an adequate exposure time $t_{SS}$ in accordance with an object brightness detected by the light metering device 81.

The shake judging device 822 judges whether the set exposure time exceeds a shake limit time $T_{LMD}$ in the case where the camera 1 is judged to be set at "auto flash mode". The shake limit time $T_{LMD}$ is a longest exposure time which enables influence of camera shake unnoticeable. For instance, the shake limit time $T_{LMD}$ is 1/(1.4×f) (sec.), wherein f denotes a focal length (mm) of the taking lens 21. If the exposure time set by the exposure time setter 821 exceeds the shake limit time $T_{LMD}$, it is presumed that the influence of camera shake appears in the photographed image.

The flash use/non-use judging device 823 judges whether the flash is required to be used based on a judgement result of the mode judging section 9 and the shake judging device 822. When the flash is judged to be required, the judging device 823 sets the flag $F_F$ at "1". On the other hand, when not to be required, the judging device 823 sets the flag $F_F$ at "0". The set flag is sent to the flash controller 84.

In other words, in the case that the set exposure time $t_{SS}$ exceeds the shake limit time $T_{LMD}$ in the "auto flash mode", or in the "slow synchro mode", the judging device 823 sets the flag $F_F$ at "1", whereas the judging device 823 sets the flag $F_F$ at "0" under the cases other than the above.

The flash 83 comprises a light emitter having a white light source such as a xenon lamp and a capacitor for charging power. The flash controller 84 controls start and suspension of power supply to the flash via the capacitor monitoring the light amount of light reflected from the object. The flash controller 84 suspends the power supply when the reflected light amount reaches a predetermined level. The flash controller 84 sends the flag $F_F$ set by the exposure setter 82 to the shake data processor 51.

The distance metering module 10 comprises an infrared light emitter diode (IRED) and a one-dimensional position sensing device (PSD) which senses light of the IRED reflected from the object, and obtains distance data corresponding to an object distance based on a reception position of the PSD.

The distance metering module 10 is not limited to such active metering method. A passive metering method may be adopted which uses a pair of line sensors for sensing light from an object. A passive metering module is so constructed that line sensors individually sense an object light image to obtain distance data corresponding to an object distance based on a difference between light images sensed by the pair of line sensors. Further, it may be appreciated to arrange a plurality of pairs of line sensors in a specified form, e.g., H-form, to selectively sense light images by one of the plurality of pairs, thereby increasing the metering accuracy.

Figure 11:
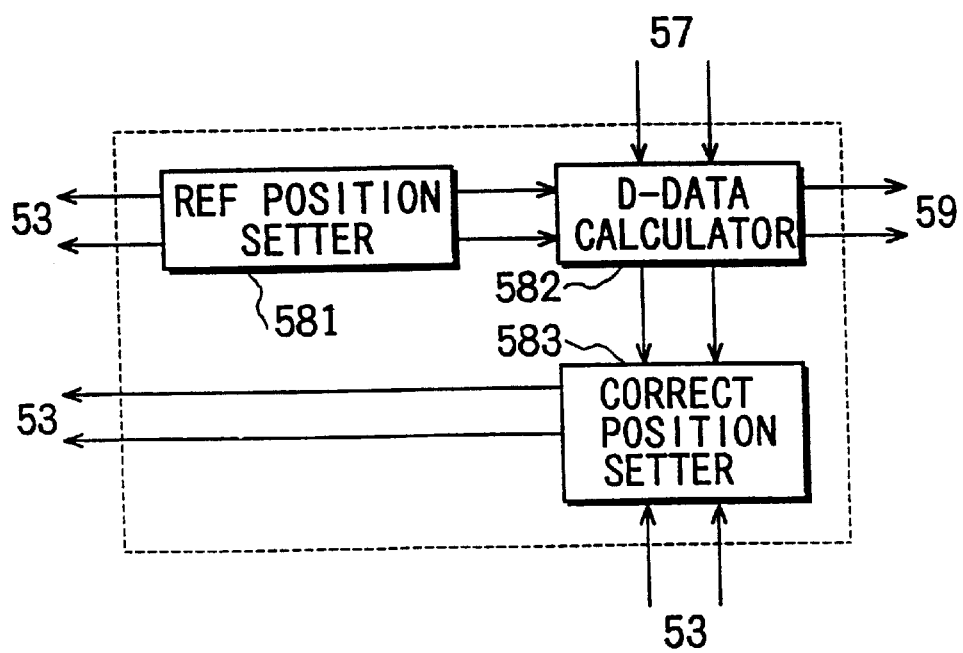
FIG. 11 is a block diagram of a reference/correction position setter provided in the camera.

The reference/correction position setter 58 of the shake correction section 5 is described with reference to FIG. 11. In FIG. 11, the reference/correction position setter 58 includes a reference position setter 581, a difference data calculator 582, and a correction position setter 583.

The reference position setter 581 sets reference position data for the horizontal and vertical directions that are used to move the respective lenses 31, 32 of the correction lens unit 3 to the center position. The difference data calculator 582 reads out, from the position data input device 57, current position data of the respective lenses 31, 32 that are moved in accordance with the reference position data in the horizontal and vertical directions, and calculates a difference between the current position and the reference position in the horizontal and vertical directions as difference data (H, V). The thus obtained difference data is transmitted to the correction position setter 583 and the posture judging device 59.

Figure 12A:
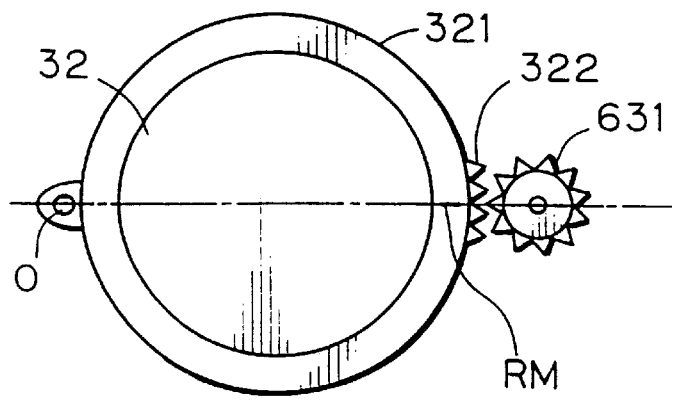
FIGS. 12A to 12C are front views of the vertical correction lens, FIG. 12A showing a state that the vertical correction lens faces upward, FIG. 12B showing a state that the camera is set in a horizontal posture, and FIG. 12C showing a state that a camera is in the vertical posture.
Figure 12B:
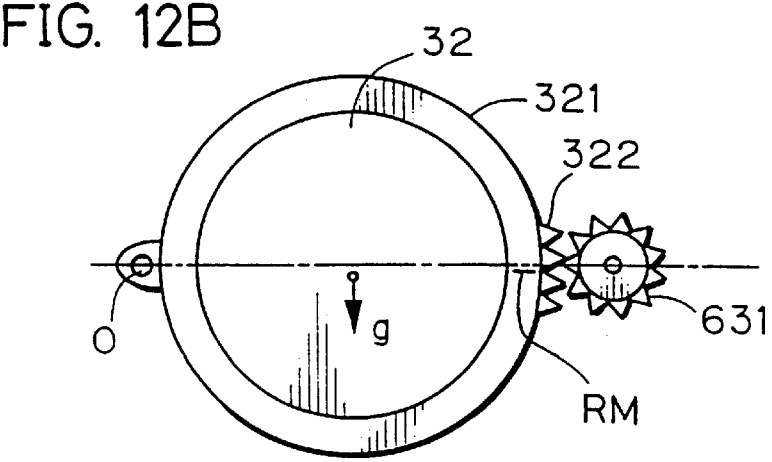
Figure 12C:
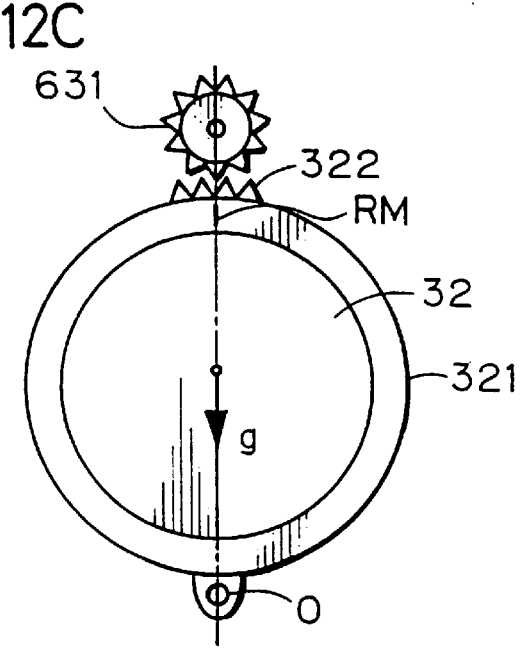

The difference data is described with reference to FIGS. 12A to 12C. FIG. 12A shows a state of the vertical correction lens 32 when the taking lens faces upward or the gravitational direction is along the optical axis of the vertical correction lens 32, FIG. 12B shows a state of the vertical correction lens 32 when the camera 1 is in the horizontal posture or the gravitational direction is along a radial direction of the correction lens 32, and FIG. 12C shows a state of the vertical correction lens 32 when the camera 1 is in the vertical posture or the gravitation direction is along another radial direction of the correction lens 32. In FIG. 12B, the vertical correction lens 32 is upright and a reference line represented by the broken line connecting the pivot O and a center of the pinion gear 631 extends in the horizontal direction. On the other hand, in FIG. 12C, the vertical correction lens 32 is upright and the reference line extends in the vertical direction.

To complete the centering, the motor 632 drives the pinion gear 631 in mesh with the rack gear 322 of the lens 32 in accordance with the reference position data for the vertical direction, and suspends the rotation of the pinion gear 631 at the position at which a reference mark RM on the frame 321 is accurately aligned with the reference line. In this time, unless the correction lens 32 and the frame 321 are subject to gravitation in a radial direction thereof, accurate centering will be attained as shown in FIG. 12A.

However, in the case where the camera 1 is in the horizontal posture, as shown in FIG. 12B, the correction lens 32 and the frame 321 are subject to gravitation g in a radial direction thereof. Consequently, the torque of the motor 632 is likely to be insufficient to elevate the correction lens 32 and the frame 321 to the position where the reference mark RM agrees with the reference line.

On the other hand, when the camera 1 is in the vertical posture, as shown in FIG. 12C, the correction lens 32 and the frame 321 are subject to gravitation g in a radial direction thereof. However, unlike the state of FIG. 12B, the torque of the motor 632 will not be against the gravitation g. Accordingly, the reference mark RM can be easily made to agree with the reference line.

Likewise, a positional displacement due to the gravitation g occurs in the horizontal correction lens 31 when the camera 1 is in the vertical posture.

Accordingly, a positional displacement of the vertical correction lens 32 under the influence of gravitation g on centering in the case of the camera 1 being in the horizontal posture is calculated in advance as difference data, and is stored in the memory 56. Likewise, a positional displacement of the horizontal correction lens 31 on centering in the case of the camera 1 being in the horizontal posture is calculated in advance as difference data, and is stored in the memory 56.

It will be seen that the posture of the camera 1 can be detected based on a positional displacement of the vertical correction lens 32 (or the horizontal correction lens 31) due to the gravitation g. This is why difference data is sent to the posture judging device 59.

Figure 13:
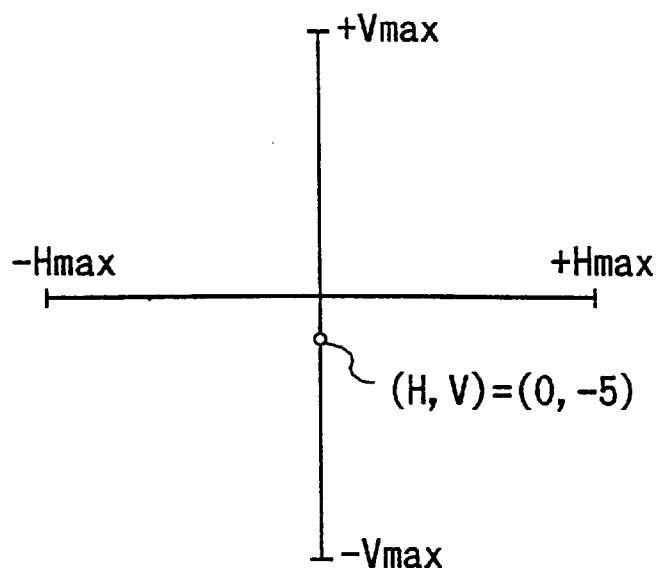
FIG. 13 is a diagram showing a stop position of the vertical and horizontal correction lenses when the camera is in a horizontal posture.
Figure 14:
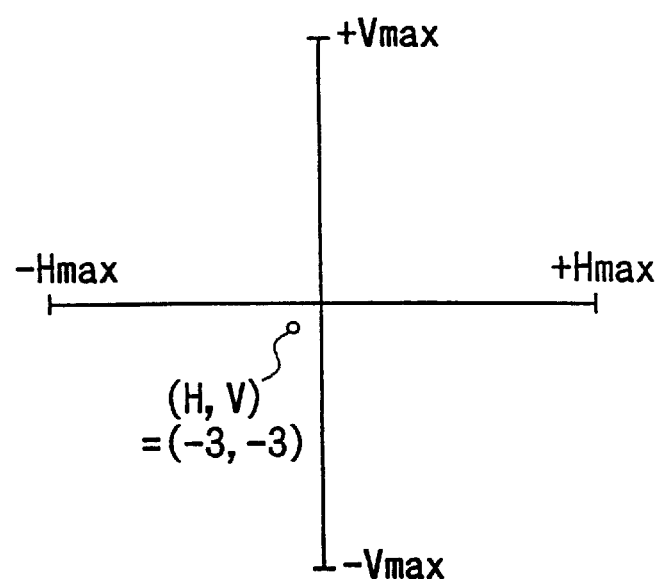
FIG. 14 is a diagram showing a stop position of the vertical and horizontal correction lenses when the camera is in an oblique posture.

FIG. 13 shows a stop position of the correction lenses 31, 32 when the camera 1 is in the horizontal posture. In FIG. 13, the horizontal correction lens 31 is moved in a range from $-H_{max}$ to $+H_{max}$, while the vertical correction lens 32 is moved in a range from $-V_{max}$ to $+V_{max}$.

The reference position data for the horizontal and vertical directions are sent to the difference data calculator 582 in the state where the camera 1 is in the horizontal posture, and the horizontal and vertical correction lenses 31 and 32 are thus moved to their respective reference positions. For example, the horizontal correction lens 31 stops at a position (H=0) and the vertical correction lens 32 stops at a position (V=−5). These positions, i.e., difference data (H, V)=(0, −5), are stored in the memory 56 as posture data indicative of the horizontal posture.

Similarly, the reference position data for the horizontal and vertical directions are sent to the difference data calculator 582 in the state where the camera 1 is in the vertical posture and the right end of the camera 1 is above, and the horizontal and vertical correction lenses 31 and 32 are thus moved to their respective reference positions. For example, the horizontal correction lens 31 stops at a position (H=−5) and the vertical correction lens 32 stops at a position (V=0). These positions, i.e., difference data (H, V)=(−5, 0), are stored in the memory 56 as posture data indicative of the vertical posture with the right end being above. Likewise, in the state where the camera 1 is in the vertical posture and the right side of the camera 1 is below, for example, the horizontal correction lens 31 stops at a position (H=5) and the vertical correction lens 32 stops at a position (V=0). These positions, i.e., difference data (H, V)=(5, 0), are stored in the memory 56 as posture data indicative of the vertical posture with the right end being below.

It may be appreciated to detect an oblique posture of the camera as well as the vertical posture detection and the horizontal posture detection. Specifically, the camera 1 is tilted 45 degree from the horizontal posture in such a direction that the right end of the camera 1 is above, and the reference position data are sent to the difference data calculator 582 so as to move the horizontal and vertical correction lenses 31 and 32 to their respective reference positions. For example, the horizontal correction lens 31 stops at a position (H=−3) and the vertical correction lens 32 stops at a position (V=−3). These positions, i.e., difference data (H, V)=(−3, −3), are stored in the memory 56 as posture data indicative of the oblique posture with the right end being above.

Further, it may be appreciated to use a single correction lens movable in two directions, and store difference data at their respective reference positions as posture data.

Furthermore, it may be appreciated to detect based on difference data whether the camera 1 is placed in a proper posture. Any posture of the camera 1 may be detected by calculating a vector based on difference data.

Referring back to FIG. 11, the correction position setter 583 is described. The correction position setter 583 corrects, based on difference data sent from the difference data calculator 582, target position data of the horizontal correction lens 31 and the vertical correction lens 32 set in the target position setter 53 by adding or subtracting difference data to or from the target position data. The corrected target position data is sent to the driving section 6 from the target position setter 53 as control data $SD_{PV}$, $SD_{PV}$. The respective correction lenses 31, 32 are accurately moved in accordance with the corrected target position data.

As an altered form, the correction position setter 583 may include a memory for storing difference data, or the RAM of the memory 56 may be used for storing difference data.

The posture judging device 59 is adapted to judge the posture of the camera 1 by comparing difference data calculated by the difference data calculator 582 and the posture data stored in the memory 56. For instance, if difference data outputted from the difference data calculator 582 is (H, V)=(0, −5), the posture judging device 59 judges that the camera 1 is in the horizontal posture, because as mentioned above, in the horizontal posture, the vertical correction lens 32 is shifted downward from the reference position under the influence of the gravitation g and the posture data is the difference data (0, −5).

In this way, the posture of the camera 1 is judged based on the posture data stored in advance in the memory 56. The selection of sensing region and focusing area will be facilitated based on a detected posture of the camera 1, thereby assuring more accurate and speedy photographing control.

The shake sensor controller 43, the signal processor 44, the shake data processor 51, the data converter 52, the target position setter 53, the correction gain setter 54, the position data input device 57, the reference position setter 58, the posture judging device 59, the exposure setter 82, the flash controller 84, and the mode judging section 9 may be totally constructed by a micro processing unit (MPU) which implements other various operations of the camera 1 as described in the following section. Alternatively, one or several of these components may be respectively constructed by a number of MPUs, respectively.

In this embodiment, the posture data are stored in the memory 56 individually for the vertical posture and the horizontal posture. Alternatively, either one of the posture data for the vertical posture and the posture data for the horizontal posture may be stored in the memory 56 in the case that the camera 1 is always in either one of the horizontal posture and the vertical posture.

Next, operations of the camera 1 are described with reference to FIGS. 15 to 18.

First, described is an operation of judging a posture of the camera 1 by the posture judging device 59. Reference position data for the horizontal and vertical directions sent from the reference position setter 581 are outputted to the driving section 6 as control data $SD_{PH}$, $SD_{PV}$. In parallel therewith, gain correction amounts for the horizontal and vertical directions set by the correction gain setter 54 are outputted to the driving section 6 as control data $SD_{GH}$, $SD_{GV}$. Subsequently, drive signals for the horizontal and vertical directions are generated in accordance with the control data $SD_{PH}$, $SD_{PV}$, $SD_{GH}$, $SD_{GV}$ to drive the correction lens unit 3.

The respective positions of the horizontal correction lens 31 and the vertical correction lens 32 after movement in accordance with the reference position data are detected by the position detecting section 7 and set as current position data in the position data input device 57. The difference data calculator 582 calculates a difference between the current position data for the horizontal and vertical directions and the reference position data for the horizontal and vertical directions, and outputs the difference as difference data (H, V) for horizontal and vertical directions to the correction position setter 583 and the posture judging device 59.

The posture judging device 59 judges a posture of the camera 1 by comparing the difference data and the posture data stored in the memory 56. For example, in the case where the difference data (H, V) outputted to the posture judging device 59 is (H, V)=(0, −5), the posture judging device 59 judges based on the posture data indicative of the horizontal posture that the camera 1 is in the horizontal posture.

Figure 15:
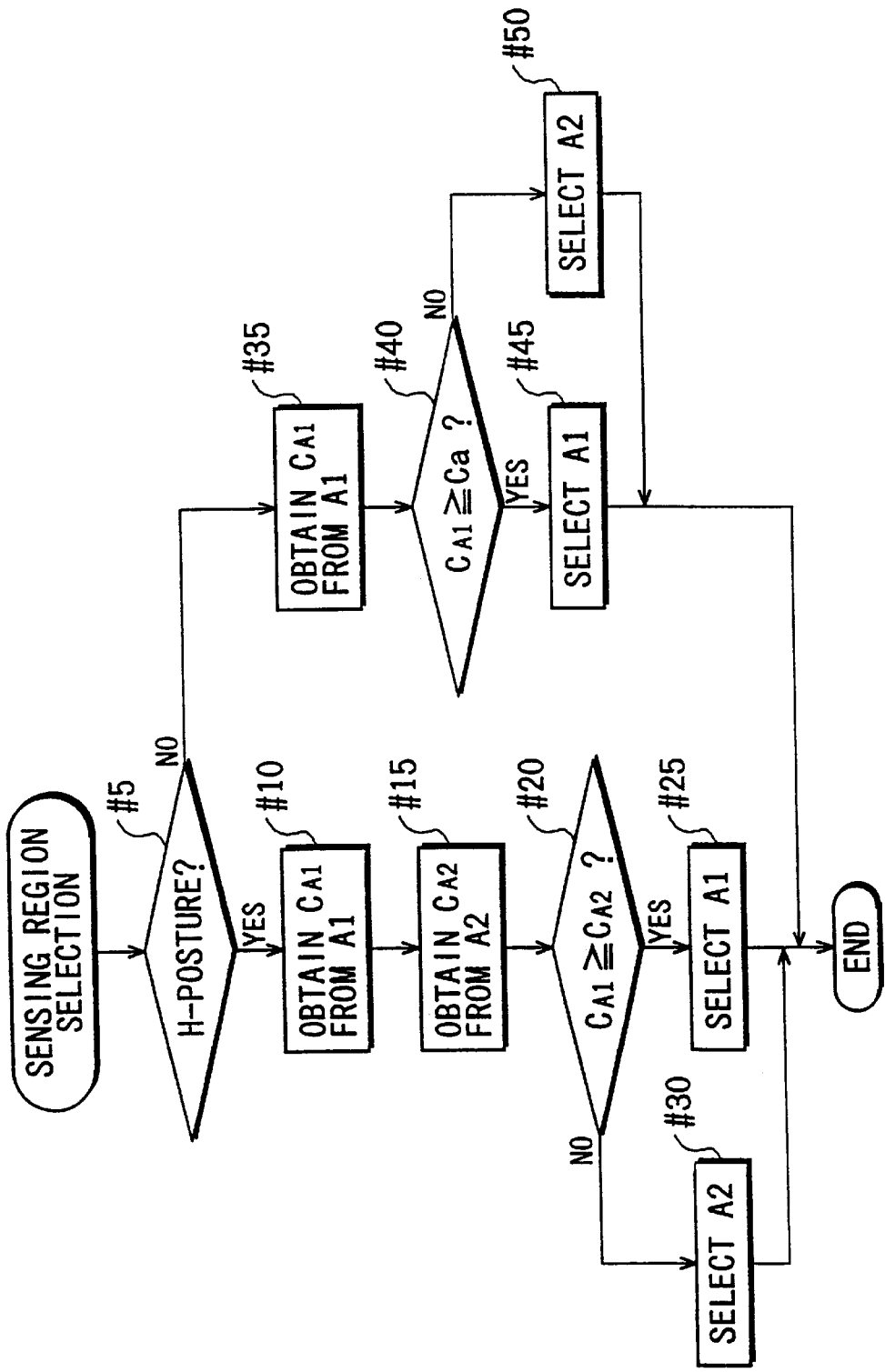
FIG. 15 is a flowchart showing a "Sensing Region Selection" routine in the case of a "flash prohibition mode"

Now, a routine "Sensing Region Selection" in the "flash prohibition mode" is described with reference to a flowchart of FIG. 15.

When this routine is started, first implemented is a judgement as to whether the camera 1 is in the horizontal posture (in Step #5).

When it is judged that the camera 1 is in the horizontal posture (YES in Step #5), image data corresponding to the sensing regions A1, A2 are read out from the memory 56 to obtain the contrasts $C_{A1}$, $C_{A2}$ therefrom (in Steps #10, #15). Subsequently, it is judged whether $C_{A1} \geq C_{A2}$ (in Step #20). If $C_{A1} \geq C_{A2}$, the sensing region A1 is selected (in Step #25). If $C_{A1} < C_{A2}$, the sensing region A2 is selected (in Step #30). Then, this routine ends.

If it is judged that the camera 1 is not in the horizontal posture (NO in Step #5), image data corresponding to the sensing region A1 is read out from the memory 56 to obtain the contrast $C_{A1}$ therefrom (in Step #35). Subsequently, it is judged whether $C_{A1} \geq Ca$ (in Step #40). If $C_{A1} \geq Ca$, the sensing region A1 is selected (in Step #45). If $C_{A1} < Ca$, the sensing region A2 is selected (in Step #50). Then, this routine ends.

In this routine, the negative judgement in Step #5 means that the camera 1 is in the vertical posture. It may be appreciated to add a step in which judgement is made as to whether the camera 1 is in the vertical posture after the negative judgement in Step #5, since there are stored in the memory 56 the posture data indicative of the vertical posture and the posture data indicative of the horizontal posture.

Figure 16:
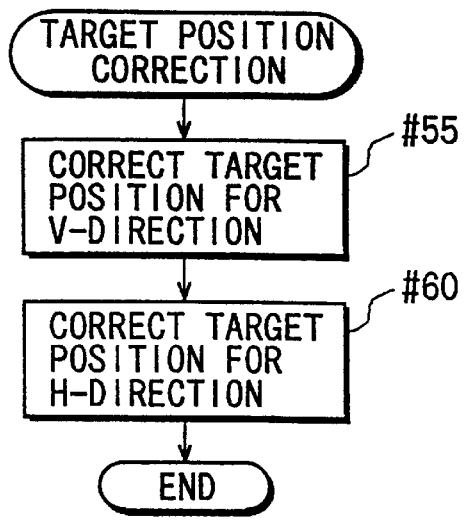
FIG. 16 is a flowchart showing a "Target Position Correction" routine in the case of a "flash prohibition mode"

Next, described is a routine "Target Position Correction" with reference to a flowchart of FIG. 16. When this routine is started, difference data for the vertical direction is added to target position data for the vertical direction set by the target position setter 53 to correct the target position for the vertical direction (in Step #55). The corrected target position data is sent to the target position setter 53 where the corrected target position data is set as control data $SD_{PV}$, and then outputted to the driving section 6.

Subsequently, difference data for the horizontal direction is added to target position data for the horizontal direction set by the target position setter 53 to correct the target position for the horizontal direction (in Step #60). The corrected target position data is sent to the target position setter 53 where the corrected target position data is set as control data $SD_{PH}$, and outputted to the driving section 6. Then, this routine ends.

Executing the above steps generate drive signals for the horizontal and vertical directions to adjust respective current positions of the correction lenses 31 and 32 to the corrected target position. The horizontal correction lens 31 and the vertical correction lens 32 are accurately moved to the corrected target positions respectively in accordance with the corresponding drive signals.

Figure 17:
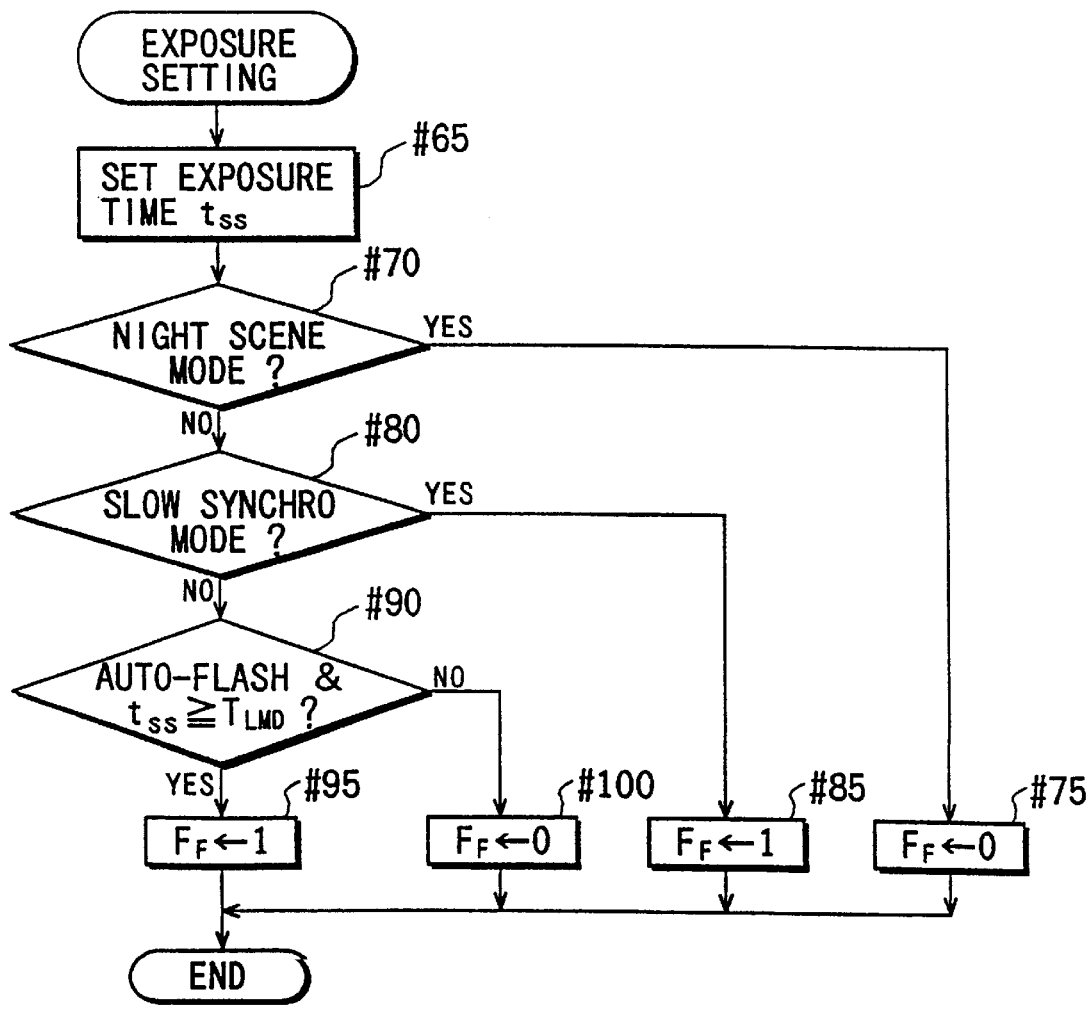
FIG. 17 is a flowchart showing a "Exposure Setting" routine in the case of a "flash prohibition mode"

Next, a routine "Exposure Setting" is described with reference to a flowchart of FIG. 17. When this routine is started, an adequate exposure time $t_{SS}$ is set in accordance with an object brightness detected by the light metering device 81 (in Step #65).

It is judged as to whether the "night scene mode" is selected (in Step #70). If the "night scene mode" is selected (YES in Step #70), the flag $F_F$ is set at "0" (in Step #75), and then, this routine ends.

If the "night scene mode" is not selected (NO in Step #70), it is judged whether the "slow synchro mode" is selected (in Step #80). If the "slow synchro mode" is selected (YES in Step #80), the flag $F_F$ is set at "1" (in Step #85). Then, this routine ends.

If the "slow synchro mode" is not selected (NO in Step #80), it is judged whether the "auto flash mode" is selected and as to whether the adequate exposure time $t_{SS}$ is greater or equal to the shake limit time $T_{LMD}$ (in Step #90). If the judgement result is affirmative, the flag $F_F$ is set at "1" (in Step #95). If the judgement result is negative, the flag $F_F$ is set at "0" (in Step #100). Then, this routine ends.

Figure 18:
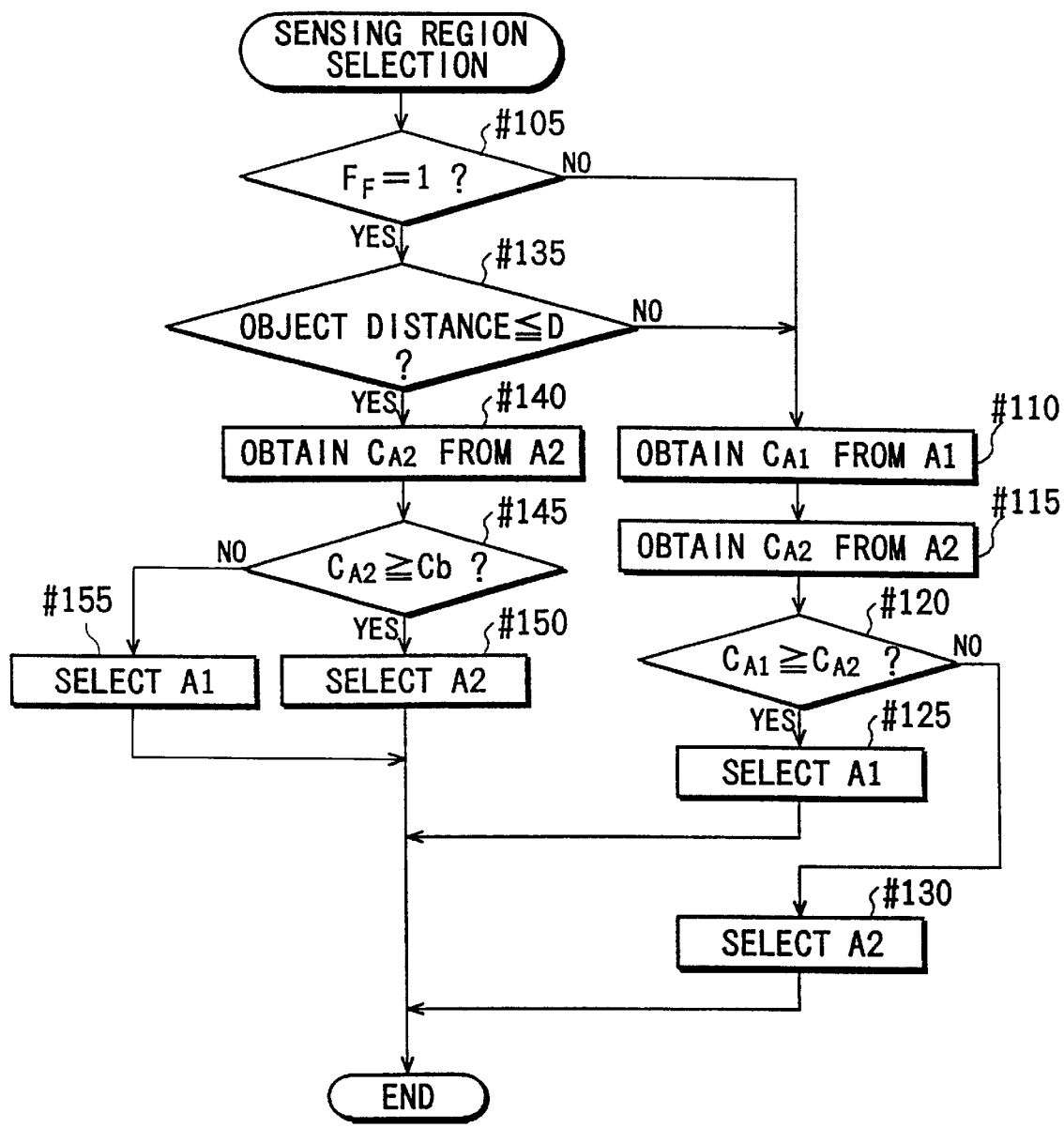
FIG. 18 is a flowchart showing a "Sensing Region Selection" routine in the case of a mode other than a "flash prohibition mode".

Lastly, a routine "Sensing Region Selection" in the case of the camera 1 being in a mode other than the "flash prohibition mode" is described with reference to a flowchart in FIG. 18.

When this routine is started, it is judged whether the flag $F_F$ sent from the exposure setter 82 is set at "1" (in Step #105). If the flag $F_F$ is not set at "1" (NO in Step #105), image data corresponding to the sensing regions A1, A2 are read out from the memory 56 to obtain contrasts $C_{A1}$, $C_{A2}$ therefrom respectively (in Step #110, #115).

Subsequently, it is judged whether $C_{A1} \geq C_{A2}$ (in Step #120). If $C_{A1} \geq C_{A2}$ (YES in Step #120), the sensing region A1 is selected (in Step #125). If $C_{A1} < C_{A2}$ (NO in Step #120), the sensing region A2 is selected (in Step #130). Then, this routine ends.

If the flag $F_F$ is set at "1" (YES in Step #105), it is judged whether the object distance is smaller or equal to the flash light coverage distance D (in Step #135). If the judgement result is negative or the object distance is judged to be greater than the flash light coverage distance D (NO in Step #135), the routine goes to Step #110. This judgement result means that the object will not receive flash light. In this case, selected is the sensing region A1 or A2 which provides higher contrast.

On the other hand, if it is judged that the object distance is not greater than the flash light coverage distance D (YES in Step #135), image data corresponding to the sensing region A2 is read out from the memory 56 to obtain contrast $C_{A2}$ therefrom (in Step #140). Subsequently, it is judged whether $C_{A2} \geq Cb$ (in Step #145). If $C_{A2} \geq Cb$, the sensing region A2 is selected (in Step #150). If $C_{A2} < Cb$, the sensing region A1 is selected (in Step #155). Then, this routine ends.

In other words, when it is judged that the object distance is not greater than the flash light coverage distance D (YES in Step #135) at the mode other than the "flash prohibition mode", the object to which the distance metering has been executed, i.e., main object, will receive sufficient flash light. In this embodiment, accordingly, the shake correction is directed to the background of the main object to ensure proper photographing of the background as well as the main object.

In this way, the selection of sensing region for shake correction is executed based on various photographing conditions, such as, use/non-use of the flash, object distance. Accordingly, the sensing region for shake correction which is most proper to a given photographing condition can be selected accurately and promptly. This will remarkably improve the quality of photographed images.

In the foregoing embodiment, the correct position data for the horizontal and vertical directions are obtained by adding difference data for the horizontal and vertical directions to the reference position data for the horizontal and vertical directions. However, it may be appreciated to calculate correction data for each camera posture specified by difference data and store the calculated correction data in the memory 56, and read out correction data from the memory 56 according to a given camera posture, and then correct target position data using the read correction data.

In the foregoing embodiment, the posture of camera is detected based on difference data with respect to reference position data for the horizontal and vertical directions for centering. As an altered arrangement, the posture of camera may be detected based on difference data with respect to target position data for shake correction.

Further, in the foregoing embodiment, the posture of camera is detected based on a displacement of the correction lenses 31, 32. However, it may be appreciated to detect the posture of camera based on a displacement of another movable member.

Although the present invention has been fully described by way of example with reference to the accompanying drawings, it is to be understood that various changes and modifications will be apparent to those skilled in the art. Therefore, unless such changes and modifications otherwise depart from the scope of the present invention, they should be construed as being included therein.

What is claimed is:

1. An optical apparatus comprising:

an optical system having an optical axis;

a correction lens movable on a plane intersecting the optical axis;

a controller which sets a target position for the correction lens;

a driver which drives the correction lens to a set target position; and a detector which detects a current position of the correction lens, wherein the controller sets a correction for the target position by comparing the current position with the target position.

2. An optical apparatus according to claim 1, wherein the controller calculates a difference between a predetermined reference position and a detected current position, and sets a correction for the target position based on a calculated difference.

3. An optical apparatus according to claim 1, wherein the controller detects a posture of the optical apparatus by comparing the current position with the target position, and sets a correction for the target position based on a detected posture.

4. An optical apparatus according to claim 1, wherein the optical apparatus is a camera.

5. An optical apparatus comprising:

a movable member movable on a predetermined plane;

a controller which sets a target position for the movable member;

a driver which moves the movable member to a set target position; and a detector which detects a position at which the movable member has been moved by a predetermined driving energy and stopped, wherein the controller detects a posture of the optical apparatus by comparing a moved position with the target position and considers the posture of the optical apparatus when setting the target position.

6. An optical apparatus according to claim 5, wherein:

the movable member includes a first correction lens movable in a first direction and a second correction lens movable in a second direction perpendicularly intersecting the first direction, the driver moves the first correction lens and the second correction lens individually, the detector detects respective moved positions of the first and second correction lenses, and the controller compares one of the moved positions of the first and second correction lenses with its corresponding target position.

7. An optical apparatus according to claim 5, wherein:

the movable member includes a correction lens movable in a first direction and a second direction perpendicularly intersecting the first direction, the driver moves the correction lens in the first and second directions, the detector detects moved positions of the correction lens in the first and second directions, respectively, and the controller compares moved positions of the correction lens in the first and second directions with their respective corresponding target positions.

8. An optical apparatus according to claim 5, wherein the optical apparatus is a camera.

9. An optical apparatus comprising:

at least one image pick-up device, in a photographing device to receive an object image, which includes a plurality of image regions that occupy different relative positions within the object image, and to output data corresponding to the plurality of image regions;

a detector to detect a shake of an obtained object image caused by a movement of the optical apparatus; and a controller to select at least one region from the plurality of image regions for use in shake control in accordance with a photographic condition that concerns an exposure value detected by the photographing device.

10. An optical apparatus according to claim 9, further comprising an electronic flash device, wherein the controller is adapted (i) to make a judgment, based on a photographic condition, whether the electronic flash device is subject to operation, and (ii) to select the prescribed portion of data output from the detector in accordance with a result of a judgment of the controller.

11. An optical apparatus according to claim 10, wherein the controller is adapted to calculate a distance to a main object and to select the prescribed portion of data output from the detector in accordance with at least one of a calculated distance and a result of a judgment by the controller.

12. An optical apparatus according to claim 11, wherein:

the detector includes a plurality of shake detection regions, and the controller selects a shake detection region in accordance with at least one of a calculated distance and a result of a judgment by the controller.

13. An optical apparatus according to claim 11, wherein:

the detector includes a plurality of shake detection algorithms, and the controller selects a shake detection algorithm in accordance with at least one of a calculated distance and a result of a judgment by the controller.

14. An optical apparatus according to claim 9, wherein:

the photographing device includes a plurality of exposure controls, and the controller is adapted to select an exposure control in accordance with a photographic condition detected by the photographing device and to select the prescribed portion of data output from the detector in accordance with a selected exposure control.

15. An optical apparatus according to claim 14, wherein the controller is adapted to calculate a distance to an object represented by the object image and to select the prescribed portion of data output from the detector in accordance with at least one of a calculated distance and a selected exposure control.

16. An optical apparatus according to claim 15, wherein:

the detector includes a plurality of shake detection regions, and the controller selects a shake detection region in accordance with at least one of a calculated distance and a selected exposure control.

17. An optical apparatus according to claim 15, wherein:

the detector includes a plurality of shake detection algorithms, and the controller selects a shake detection algorithm in accordance with at least one of a calculated distance and a selected exposure control.

18. An optical apparatus comprising:

an area sensor including a plurality of shake detection regions;

a posture detector which detects a posture of the optical apparatus; and a selector which selects a shake detection region from the plurality of shake detection regions, wherein the selector operatively selects the shake detection region based on both a detected posture of the optical apparatus and image information output from the plurality of detection regions, and wherein the image information used to select a shake detection region is independent of image information used for focus detection.

19. An optical apparatus according to claim 18, further comprising:

a movable member movable on a predetermined plane;

a driver which sets a target position for the movable member, and moves the movable member to a set target position; and a position detector which detects a position at which the movable member has been moved by a predetermined driving energy and stopped;

wherein the posture detector detects a posture of the optical apparatus by comparing a moved position with the target position.

20. An optical apparatus comprising:

a photographing device to obtain an object image;

a detector to detect a shake of the object image caused by a movement of the optical apparatus based on a prescribed region within a field of view; and a controller to select a first region from a plurality of regions within the field of view in accordance with a photographic condition of the photographing device, and to select a region used for shake control from the plurality of regions based on an output from the first selected region.

21. An optical apparatus comprising:

a photographing device to obtain an image that includes an object;

a detector to detect a shake of an obtained object image caused by a movement of the optical apparatus;

a controller which controls a detection manner of the detector in accordance with a condition of the object; and an electronic flash device, wherein the controller is adapted (i) to make a judgment, based on the condition of the object, whether the electronic flash device is subject to operation, and (ii) to control the detection manner in accordance with a result of the judgment.

22. An optical apparatus according to claim 21, wherein the controller is adapted to calculate a distance to a main object and to control the detection manner in accordance with at least one of a calculated distance and a result of the judgment by the controller.

23. An optical apparatus according to claim 22, wherein:

the detector includes a plurality of shake detection regions, and the controller selects a shake detection region in accordance with at least one of a calculated distance and a result of a judgment by the controller.

24. An optical apparatus according to claim 22, wherein:

the detector includes a plurality of shake detection algorithms, and the controller selects a shake detection algorithm in accordance with at least one of a calculated distance and a result of a judgment by the controller.

25. An optical apparatus comprising:

a photographing device to obtain an image that includes an object;

a detector to detect a shake of an obtained object image caused by a movement of the optical apparatus; and a controller which controls a detection manner of the detector in accordance with a condition of the object, wherein the photographing device includes a plurality of exposure controls, and wherein the controller is adapted to select an exposure control in accordance with the condition of the object, and to control the detection manner in accordance with a selected exposure control.

26. An optical apparatus according to claim 25, wherein the controller is adapted to calculate a distance to the object and to control the detection manner in accordance with at least one of a calculated distance and a selected exposure control.

27. An optical apparatus according to claim 26, wherein:

the detector includes a plurality of shake detection regions, and the controller selects a shake detection region in accordance with at least one of a calculated distance and a selected exposure control.

28. An optical apparatus according to claim 26, wherein:

the detector includes a plurality of shake detection algorithms, and the controller selects a shake detection algorithm in accordance with at least one of a calculated distance and a selected exposure control.

29. An optical apparatus comprising:

at least one image pick-up device to receive an object image, which includes a plurality of image regions that occupy different relative positions within the object image, and to output data corresponding to the plurality of image regions;

a shake detector to detect a shake of an obtained object image caused by a movement of the optical apparatus;

a distance detector to detect a distance between the optical apparatus and an object subject for shake control; and a controller to select at least one region from the plurality of image regions for use in shake control in accordance with a photographic condition that concerns a distance by the distance detector.

30. An optical apparatus comprising:

at least one image pick-up device to receive an object image, which includes a plurality of image regions that occupy different relative positions within the object image, and to output data corresponding to the plurality of image regions;

a shake detector to detect a shake of an obtained object image caused by a movement of the optical apparatus; and a controller to select at least one region from the plurality of image regions for use in shake control in accordance with whether the optical apparatus is held in a vertical orientation or in a horizontal orientation.

31. An optical apparatus comprising:

at least one image pick-up device to receive an object image, which includes a plurality of image regions that occupy different relative positions within the object image, and to output data corresponding to the plurality of image regions;

a shake detector to detect a shake of an obtained object image caused by a movement of the optical apparatus; and a controller to select at least one region from the plurality of image regions for use in shake control in accordance with an object image contrast characteristic detected by the optical apparatus.

32. An optical apparatus comprising:

a photographing device to obtain an object image defining a field of view including a plurality of regions;

a detector to detect a shake of an object image obtained by the photographing device caused by a movement of the optical apparatus based on a prescribed region within the field of view; and a controller (i) to select at least one region from the plurality of image regions for use in shake control based on an object image contrast characteristic detected by the optical apparatus and (ii) to choose a region from the plurality of regions for shake control based on an output supplied from the selected image region(s).

* * * * *